United States Patent [19]

Woodson et al.

[11] Patent Number: 5,053,689

[45] Date of Patent: Oct. 1, 1991

[54] METHOD AND APPARATUS FOR IMPROVING PERFORMANCE OF AC MACHINES

[75] Inventors: Herbert H. Woodson; John S. Hsu, both of Austin, Tex.

[73] Assignee: University of Texas at Austin, Austin, Tex.

[21] Appl. No.: 405,632

[22] Filed: Sep. 11, 1989

Related U.S. Application Data

[63] Continuation-in-part of Ser. No. 888,818, Jul. 22, 1986.

[51] Int. Cl.⁵ .............................................. H02P 5/00
[52] U.S. Cl. .................................... 318/705; 318/718; 318/439
[58] Field of Search ................. 318/700, 705, 712–715, 318/720, 724, 798–802, 806–809, 812, 254, 703, 716–718, 138, 439, 767–768, 771–772; 310/79, 160, 162, 166

[56] References Cited

U.S. PATENT DOCUMENTS

| | | | |
|---|---|---|---|
| 3,970,914 | 3/1975 | Salzmann et al. | 318/812 |
| 4,088,934 | 4/1978 | D'Atre et al. | 318/802 |
| 4,225,914 | 9/1980 | Hirata et al. | 363/43 |
| 4,243,927 | 1/1981 | D'Atre | 318/803 |
| 4,442,393 | 4/1984 | Abbondanti | 318/802 |
| 4,573,003 | 2/1986 | Lpu | 318/722 |
| 4,736,147 | 4/1988 | Shizbarg | 318/771 |

*Primary Examiner*—William M. Shoop, Jr.
*Assistant Examiner*—David Martin
*Attorney, Agent, or Firm*—Arnold, White & Durkee

[57] ABSTRACT

A method and apparatus for improving the performance of polyphase AC machines. The polyphase AC machines are excited both with a fundamental frequency and with an odd harmonic of the fundamental frequency. The odd harmonic flux wave is phase controlled so as to interact with otherwise waste harmonic flux waves generated by the rotor. The interaction of the harmonic flux waves enhances the pull-out torque, power factor, and efficiency of the polyphase AC machine.

20 Claims, 22 Drawing Sheets

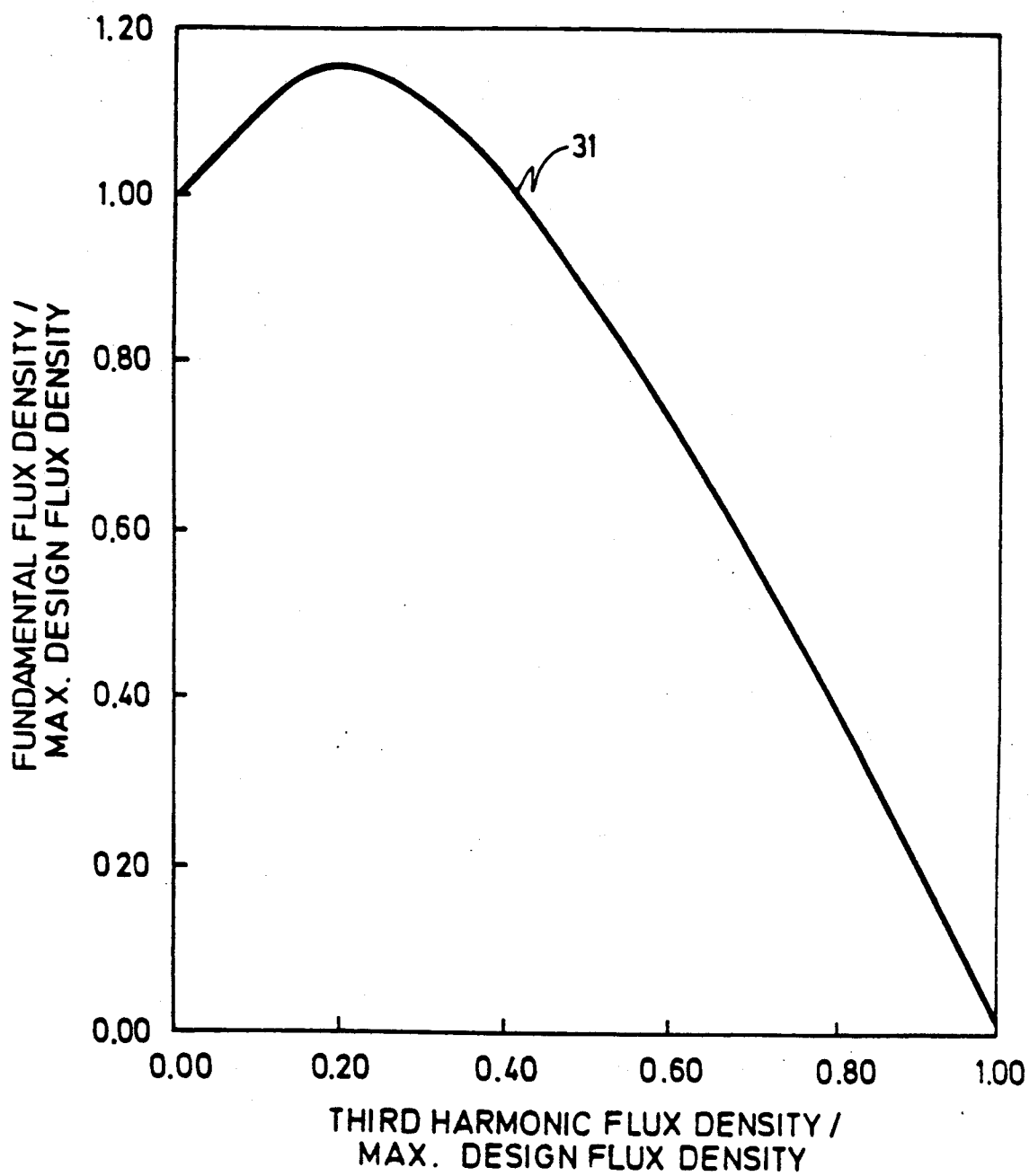

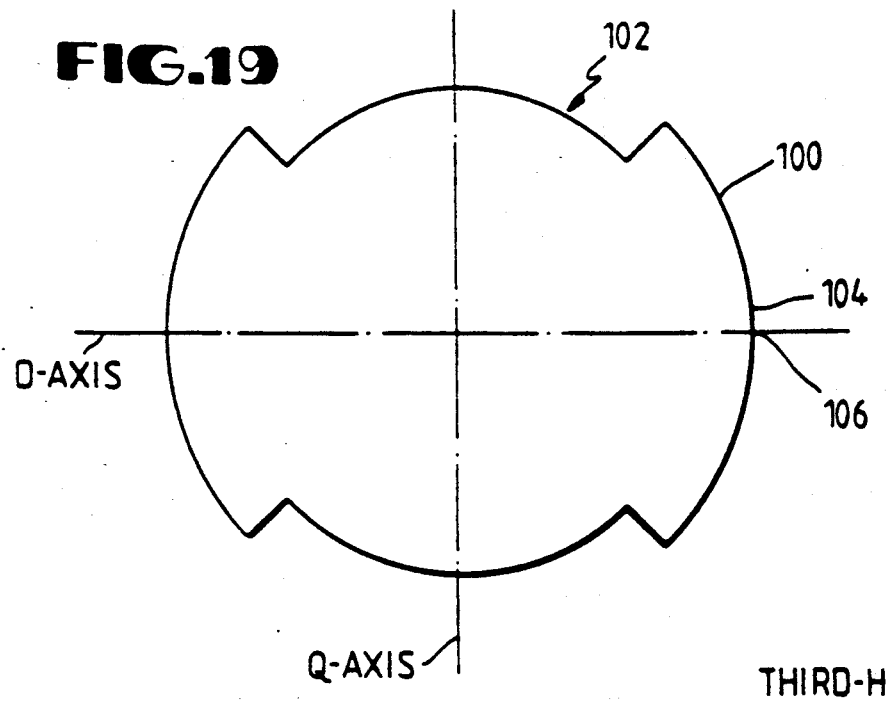
FIG.19
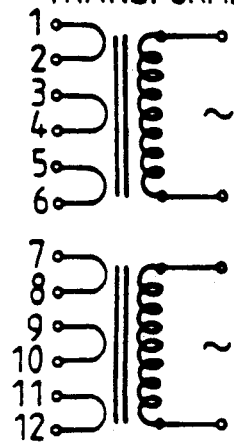
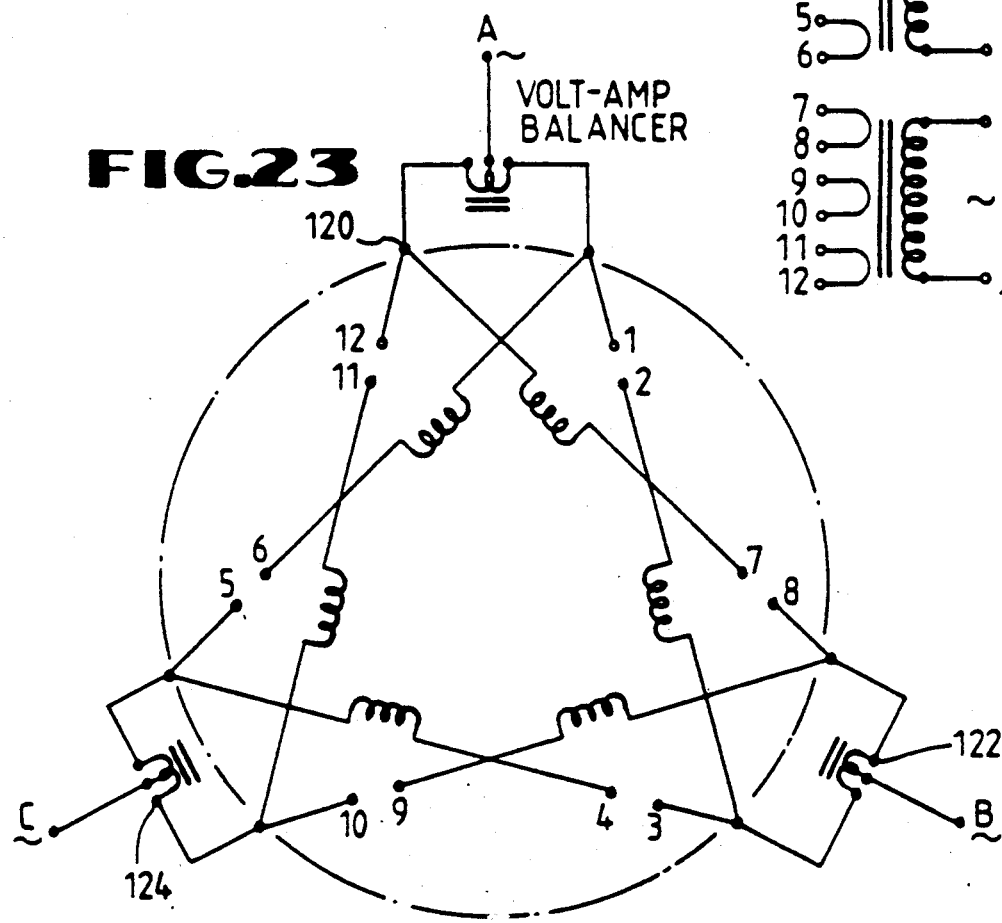
FIG.23

METHOD AND APPARATUS FOR IMPROVING PERFORMANCE OF AC MACHINES

This is a continuation-in-part of co-pending application Ser. No. 888,818 filed on July 22, 1986.

BACKGROUND OF THE INVENTION

The present invention relates generally to methods and apparatus for improving the performance of alternating current (AC) machines and, more specifically, to methods and apparatus for improving the pull-out torque, power factor, and efficiency of synchronous reluctance machines through the controlled injection of harmonic excitation into the stator winding of the synchronous machine.

Conventional polyphase AC machines, both induction and synchronous, are typically operated by a single frequency source. These machines have stator windings to which the single frequency sine waves are applied. The performance characteristics of conventional polyphase AC machines include a sinusoidal air-gap flux wave of constant amplitude rotating around the stator winding within the air-gap at synchronous speed. In this theoretical, ideal polyphase AC machine, the constant amplitude flux wave produces a constant electromagnetic torque. The torque of the machine is monotonically dependent upon this constant amplitude flux wave. This ideal situation is approximated in large scale machines.

In conventional AC machines, the magnetic flux per pole of the machine is proportional to the area of $\frac{1}{2}$ sine wave of the air-gap flux wave of the machine. Typically, a conventional AC machine is designed to operate with at least one of the magnetic members, the iron core or teeth, of the machine at flux saturation. Thus, the saturation flux densities of the iron, or other magnetic members, of the stator and rotor determine the maximum amplitude of the air-gap flux wave. Therefore, the amplitude of the fundamental flux sine wave determines the maximum power output of a conventional machine. This is true even though maximum use is not made of all of the flux capability of the magnetic members. It should be appreciated that operation of the machine in this saturated region results in undesirable core losses and magnetization currents.

Moreover, conventional AC machines typically produce ordinarily undesirable space harmonics in their air-gap. These naturally-arising space harmonics occur as a function of the particular machine design when excited by a fundamental frequency. Factors such as slots in the machines and core saturation contribute to the generation of these undesirable space harmonics; however, they are primarily produced by the interaction between the stator flux wave and the nonuniformly distributed air-gap permeance. These space harmonic flux waves are undesirable because they typically rotate in the air-gap at speeds other than that at which the fundamental flux wave rotates. Additionally, the space harmonic flux waves rotates in both forward and backward direction, as well as at different speeds, relative to the fundamental flux wave.

For example, a naturally-arising fifth space harmonic flux wave rotates in a reverse direction relative to the fundamental flux wave at 1/5 the speed of the fundamental flux wave. Similarly, a naturally-arising seventh space harmonic flux wave travels in the same direction as the fundamental flux wave, but at 1/7 the speed.

These space harmonic flux waves interact with the squirrel cage winding in an induction motor, or with the damper winding in a synchronous motor, to produce a braking torque that reduces the useful output of the machine. Additionally, these naturally-generated space harmonic flux waves interact with each other and with the fundamental flux wave to cause pulsations in the torque of the machine, as well as undesirable mechanical vibrations.

Accordingly, the present invention provides a new method and apparatus for constructing and operating a polyphase AC machine whereby harmonic excitation is applied to the stator windings to produce a harmonic flux wave that is phase controlled to interact with the naturally occurring harmonic flux wave and enhance the pull-out torque, power factor, and efficiency of the machine.

SUMMARY OF THE INVENTION

The methods and apparatus of the present invention improve the performance of polyphase AC machines through excitation of the machine with frequencies that are odd harmonics of the fundamental excitation frequency. This odd harmonic excitation serves to improve performance of the machine by interacting with a naturally-arising odd harmonic flux wave induced by the interaction between the fundamental flux wave and the rotor.

As discussed in more detail herein, this odd harmonic excitation can be practiced in a variety of ways, including: separate coils for fundamental excitation and for each odd harmonic excitation; multiphase power supplies for both fundamental and harmonic frequencies coupled to a common winding; the use of a multiplicity of delta-connected windings coupled to one another through volt-amp balancers, with separate phases of the harmonic excitation current applied to each delta; and a common set of delta-connected windings actuated through use of a multiphase inverter, with a separate phase of the harmonic excitation current applied to each delta.

BRIEF DESCRIPTION OF THE DRAWINGS

FIG. 1A depicts a sinusoidal flux distribution. FIG. 1B depicts a square wave flux distribution. FIG. 1C depicts a total flux distribution achieved by adding an increased level of fundamental flux distribution with a third harmonic flux distribution. FIG. 1D depicts a total flux distribution achieved by adding a further increased fundamental flux distribution with third and fifth harmonic flux distributions.

FIG. 2A depicts the flux distributions with the machine operated with neither of the magnetic members in saturation. FIG. 2B depicts how the flux distributions in a typical low speed machine can be adjusted through practice of the present invention to improve machine performance. FIG. 2C depicts how the flux distributions in a typical high speed machine can be adjusted through practice of the present invention to improve machine performance.

FIG. 3 graphically depicts the relationship between the ratio of the fundamental flux density to the maximum design flux density of a machine and the ratio of the third harmonic flux density to the maximum design flux density of the machine.

FIG. 19 schematically depicts a rotor of a conventional 2-pole, groove-type, salient pole reluctance machine.

FIG. 23 schematically depicts the connection arrangement of a 6-pole reluctance machine with a 36-slot stator winding as one embodiment of the power supply of FIG. 22A.

DETAILED DESCRIPTION OF THE PREFERRED EMBODIMENT

The present invention utilizes the injection of harmonic frequencies into the excitation current of a polyphase AC machine in order to accomplish enhanced machine performance by two separate and distinct methods. The first method optimizes the flux density in both the iron portion and the air-gap portion of the machine. Those skilled in the art readily recognize that the resulting increase in total flux in the machine yields improved performance of the machine. Additionally, the second method for enhancing machine performance involves controlling the phase angle of the harmonic excitation so that the resultant odd harmonic flux wave interacts with naturally-arising odd harmonic flux waves to enhance machine performance characteristics, such as pull-out torque, power factor, and efficiency.

An appreciation of the operation of the first method is had by referring to FIGS. 1A-D of the drawings. Each Figure graphically depicts the total flux distribution in a preselected section of the magnetic path of an AC machine under the influence of different excitation waveforms. The ordinate of each graph represents the phase angle of the flux wave, while the abscissa represents the ratio of the actual flux distribution (B) to the maximum design flux density ($B_s$) in the machine.

Figure 1A:
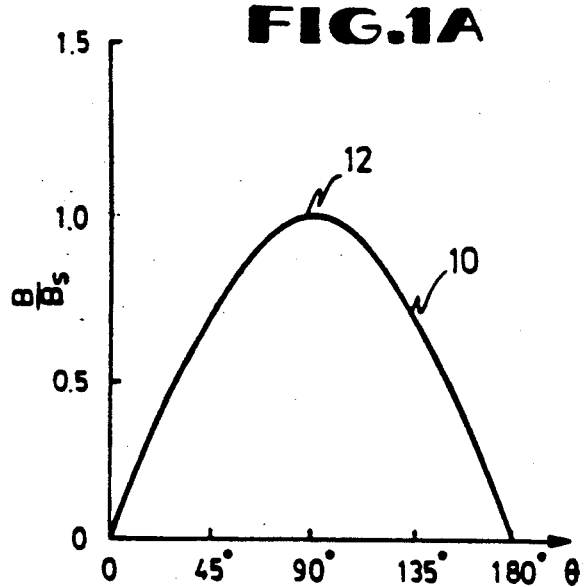
FIGS. 1A-D graphically depict the flux distribution in a section he magnetic path of an AC machine.

FIG. 1A depicts a sinusoidal flux distribution 10 in the magnetic path, resulting from a sinusoidal excitation current. This, of course, represents the flux distribution ordinarily achieved in standard synchronous motors. Flux distribution 10 has a peak amplitude 12 that corresponds to saturation of one of the motor components. It should be appreciated that while increasing the amplitude of the flux wave necessarily increases the total flux present in the machine, operation of those portions of the machine in the saturation region results in undesirable core losses and magnetization currents, which offset any performance gain arising from the increased total flux.

Figure 1B:
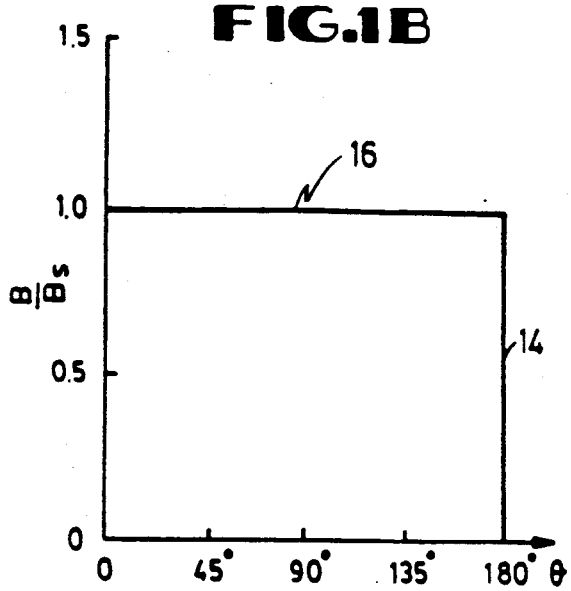

Therefore, it is desirable to increase the total flux of the machine without exceeding the saturation level of any of the selected portions of the machine. In other words, the optimal flux distribution ideally approaches this saturation level and maintains that level throughout the phase angle. Accordingly, a square wave flux distribution represents optimal machine performance. FIG. 1B depicts a square wave flux distribution 14 having an amplitude 16 equal to the peak amplitude 12 of sinusoidal distribution 10 in FIG. 1A. This square wave distribution represents the theoretical maximum flux density and corresponds to maximum motor performance. The theoretical flux per pole of a machine that employs the square wave flux distribution 14 of FIG. 1B is 1.57 times greater than the flux per pole of a machine that employs the sinusoidal flux distribution 10 of FIG. 1A. Such a theoretical machine optimizes usage of the flux capacity of the iron portions of the machine. Square wave excitation and its corresponding flux distribution, however, cannot be produced in practical machines because practical power supplies are not available.

On the other hand, a square wave can be synthesized by an infinite set of odd harmonics. Although such synthesization is impractical, a square wave can be approximated by a finite set of odd harmonics. FIG. 1C depicts a flux distribution 18 achieved by first increasing the fundamental flux distribution 19 and then adding a third harmonic flux distribution 20. The flux per pole of flux distribution 18 is 1.23 times that of the sinusoidal flux distribution 10 resulting from only fundamental sinusoidal excitation. It should be noted that the peak value of the fundamental flux distribution 21, exceeds the saturation level of the machine; however, selective introduction of odd harmonic excitation effectively redistributes this additional flux to avoid saturation. As is well known in the field of electrodynamic machines, fundamental excitation beyond the saturation point produces no increase in machine performance, and, in fact, typically results in undesirable magnetization current and core losses.

Figure 1D:
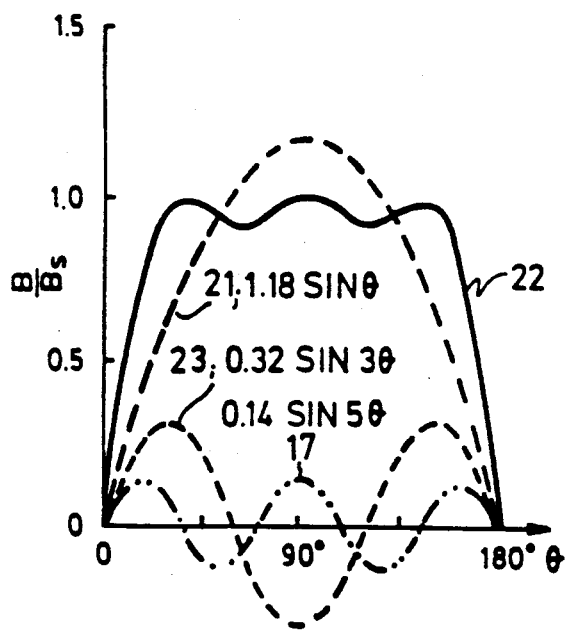
Figure 1C:
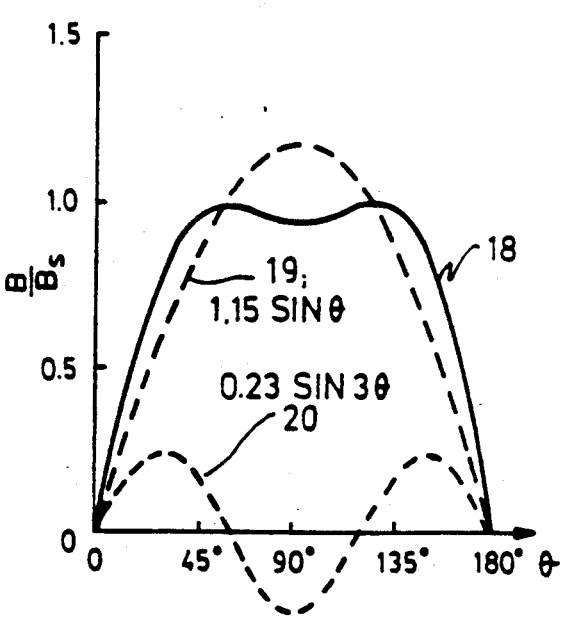

FIG. 1D depicts a flux distribution 22 achieved by adding a further increased fundamental flux distribution 21 to an increased third harmonic flux distribution 23 and a fifth harmonic flux distribution 24. The flux per pole of flux distribution 22 is 1.31 times that of sinusoidal flux distribution 10.

Additional correlated odd harmonic flux distributions provide further increases in the flux per pole relative to the sinusoidal flux distribution 10, which results from fundamental excitation only. The further addition of these odd harmonic flux distributions causes the total flux distribution to approach the flux per pole of square wave flux distribution 14. However, additional odd harmonic flux distributions yield smaller incremental changes than those provided by the addition of the third and fifth harmonics, as depicted in FIGS. 1C and 1D. In fact, the addition of the third harmonic flux distribution facilitates the greatest increase in the total flux distribution and is, therefore, discussed here in the greatest detail.

Figure 2A:
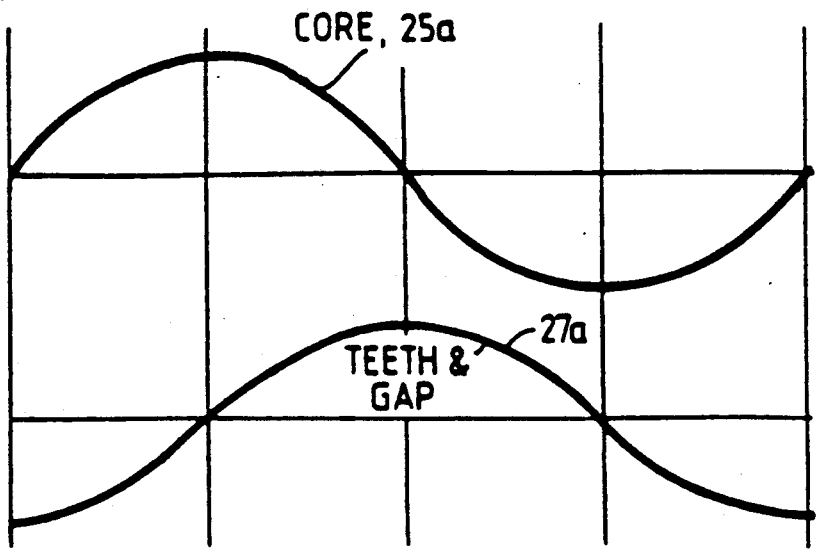
FIGS. 2A-C graphically depict the flux distributions in different portions of an AC machine.
Figure 2B:
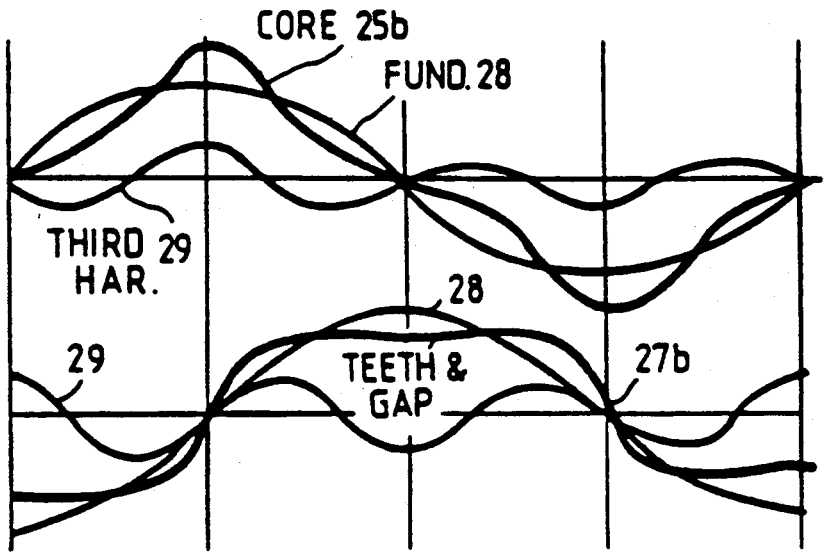
Figure 2C:
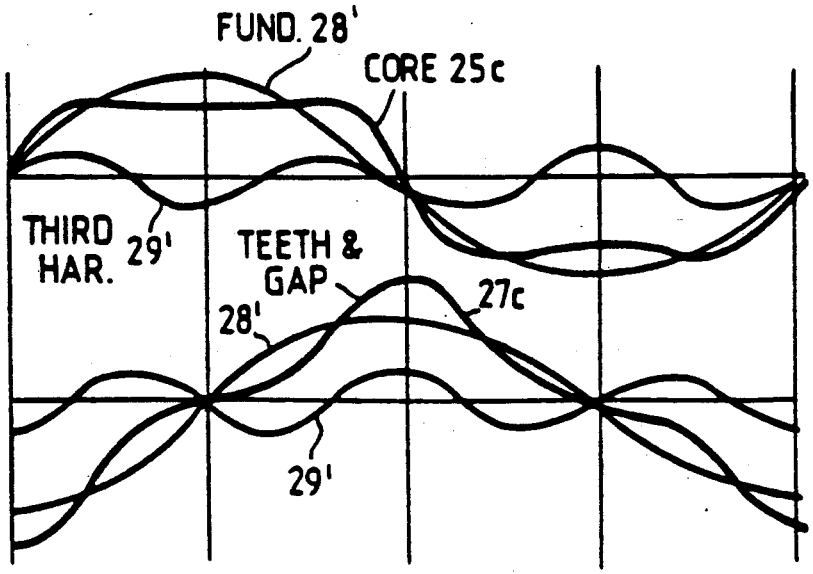

Referring now to FIGS. 2A-C, graphically depicted in each figure are the core flux distributions 25a, 25b, and 25c in respective figures, and the teeth and gap flux distributions, 27a, 27b, and 27c in respective figures, in a machine operating under three different conditions. Conventional practice in the design of polyphase AC machines is to design the flux densities in the stator core, the stator teeth, the rotor core, and the rotor teeth in such a way as to avoid excessive flux saturation in any particular section. This practice serves to limit magnetization current and core loses to acceptable values. The air-gap flux distribution can be other than a sinusoidal waveform, distortion in the distribution being largely dependent upon the degree of saturation in the magnetic paths.

FIG. 2A depicts the core flux distribution 25a, and the teeth and gap flux distribution 27a of a machine wherein neither section of the machine is saturated. Each flux distribution is a sinusoid in response to the fundamental frequency excitation. Core flux distribution 25a is derived by integrating the teeth and gap flux distribution 27a, and is, therefore, spaced 90~ from the teeth and gap flux distribution 27a.

In reality, a machine is ordinarily operated with at least one section of the machine approaching saturation. Further, the degree of saturation in different magnetic paths cannot be totally equal. For example, in a low speed machine that has a large number of poles, flux densities in the stator and rotor cores are much lower than the flux densities in the stator and rotor teeth. The reason is that the minimum dimension of each core is determined by mechanical requirements, such as rigidity, stress, and manufacturing requirements; but is not determined by electromagnetic requirements. Saturation of the teeth is, therefore, a determining factor for how much flux per pole can be produced in the machine. Conversely, for high speed machines, such as two pole machines, the core sections are typically more saturated than the teeth sections.

The performance, and therefore the rating, of an AC machine is affected by the total flux per pole that is produced in the machine. Introducing odd harmonic excitation increases the total flux per pole in a polyphase AC machine path while decreasing the flux density in another magnetic path. This redistribution of the flux is accomplished by adjusting the phases of the harmonic excitation relative to the fundamental excitation. For example, FIG. 2B depicts exemplary flux distributions contemplated through use of the present invention in a low speed machine as discussed above. The density of the core flux 27b is increased through use of fundamental flux distribution 28 and third harmonic flux distribution 29. The injection of third harmonic excitation current to establish third harmonic flux distribution 29, therefore, facilitates increasing the density of the core flux 25b while decreasing the density of teeth and gap flux distribution 27b. This improves flux distribution in the machine, and, most importantly, increases the total flux per pole in the machine.

FIG. 2C, depicts exemplary flux distributions contemplated through use of the present invention with a high speed machine as discussed above. In FIG. 2C, the phase angle of third harmonic flux distribution 29' is altered relative to fundamental flux distribution 28'. This results in a decrease in the density of core flux 25c and facilitates an increase in teeth and gap flux 27c. This again promotes an improved flux distribution and facilitates an increased total flux per pole in the machine.

Referring now to FIG. 3, therein is graphically depicted, by a curve 31, the relationship between the fundamental flux density and the third harmonic flux density in a machine. The abscissa of the graph of FIG. 3 represents the ratio of the fundamental flux density to the maximum design flux density of a machine, while the ordinate represents the ratio of the third harmonic flux density to the maximum design flux density of the machine. The relation expressed in curve 31 assumes that the total flux density in the machine remains unchanged.

In determining the relative amplitudes for the fundamental and third harmonic excitation voltages, the maximum third harmonic voltage should be applied that facilitates the maximum fundamental voltage that can be applied to improve machine performance without exceeding the thermal rating of the machine. In addition to this primary parameter, however, the actual ratio between the fundamental and third harmonic excitation voltages is affected by secondary factors, such as changes in core losses due to the excitation by both fundamental and third harmonic frequencies, or changes in deleterious naturally-occurring space harmonics as discussed earlier herein, etc. The amplitude and the relative phases of all excitations are synchronized, so as to produce optimal flux densities as discussed earlier herein.

Referring now to FIGS. 19-23, the second method for enhancing performance of different types of AC machines by injecting odd harmonic excitation signals is discussed. With respect to any of the below discussed polyphase AC machines, because harmonic sinusoids of different frequencies are orthogonal, the fundamental and each harmonic of the stator-produced flux wave interacts to produce torque only with its counterpart in the rotor produced flux wave. That is to say, the fundamental flux wave, of course, interacts with the poles of the rotor, but the odd harmonic flux waves only produce additional torque if they coincide with a naturally occurring flux wave that arises from the interaction between the fundamental flux wave and the air-gap permeance.

The benefits from this second method of odd harmonic excitation are achievable with different types of AC machines, including, for example: squirrel cage induction motors, wound rotor induction motors, and both salient pole and round rotor synchronous machines. Different practical considerations with respect to the odd harmonic excitation are found with these different machines, however. For example, a squirrel cage induction motor experiences enhanced torque production from the increased fundamental component facilitated through harmonic injection, as depicted in FIGS. 1C and 1D. Additionally, a squirrel cage induction motor also experiences enhanced torque production from each odd harmonic excitation signal that produces a flux component capable of interacting with the rotor. This is only true provided that the conductors forming the squirrel cage on the rotor are properly spaced to allow each odd harmonic flux wave to induce current to flow therein. If, for example, the number of bars is so small that one or more space harmonic current cannot flow, then no torque is produced by those space harmonics in the stator flux wave.

In a wound rotor induction motor, the number of poles produced by the rotor winding is determined by the winding configuration on the rotor. As a consequence, torque is produced by each flux component in the armature for which there is a corresponding winding having a suitable number of poles on the rotor. For purposes of this discussion, the stator has a fundamental winding and one or more harmonic windings. If the rotor has only a fundamental winding, the machine experiences enhanced torque from the higher armature fundamental flux density component, as seen in FIGS. 1C and 1D. However, if the rotor includes windings having the correct number of poles to interact with the stator harmonic flux distributions, additional torque is produced by each of these flux distributions also. It should be noted that it is not necessary that physically separate windings are available in the stator, but rather, merely that the stator winding be arranged to accept both fundamental and odd harmonic excitation and provide a fundamental and odd harmonic flux wave that maintain a desired phase relationship.

With respect to synchronous machines, torque results from the interaction of the flux wave produced by the stator excitation with the steady magnetic field produced by direct current in the rotor winding. Naturally-arising space harmonics occur in the air gap, owing to interaction between the stator flux wave and the nonuniform air-gap permeance caused by the rotor field. These space harmonics are affected by properly shaping the poles in a salient pole machine, or by properly distributing the rotor winding in a round-rotor machine. If current in the rotor winding produces only a fundamental component of flux density, torque enhancement results only from the increased stator fundamental flux component made possible by the harmonic components in the flux wave. However, for each harmonic component in the naturally-arising, rotor-produced flux wave that matches a harmonic in the stator flux wave, further torque enhancement occurs. In a salient pole synchronous machine, if the salient poles are properly shaped, then additional torque is produced by the interaction between the harmonic stator flux waves with the harmonic components of the rotor flux wave.

Figure 20:
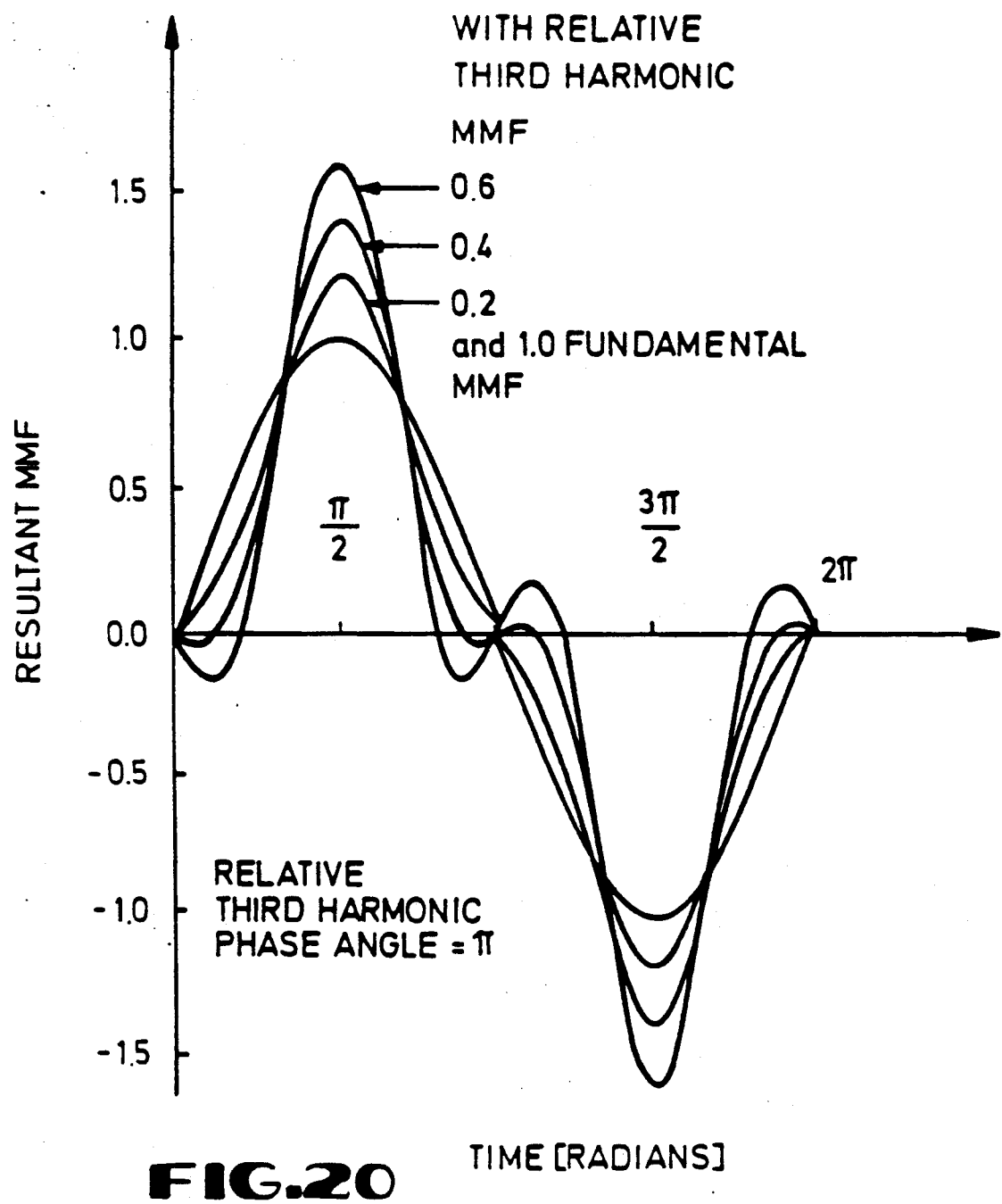
FIGS. 20A-B graphically depict the relationship between the D and Q axis components of the fundamental flux wave, air-gap permeance of the rotor of FIG. 19, and the resultant third-harmonic flux wave.

A better appreciation of the generation of these naturally-arising harmonic flux waves may be had by referring to FIGS. 19–21. FIG. 19 depicts a conventional groove-type, salient-pole reluctance rotor 100. The rotor 100 includes a region 102 that receives a field winding and orients an electromagnetic field generally along the D-axis. The rotor 100 is, of course, centrally positioned within a stator of a synchronous motor. Moreover, the rotor 100 is subjected to the fundamental flux wave generated by the fundamental excitation applied to the stator windings.

Figure 20A:
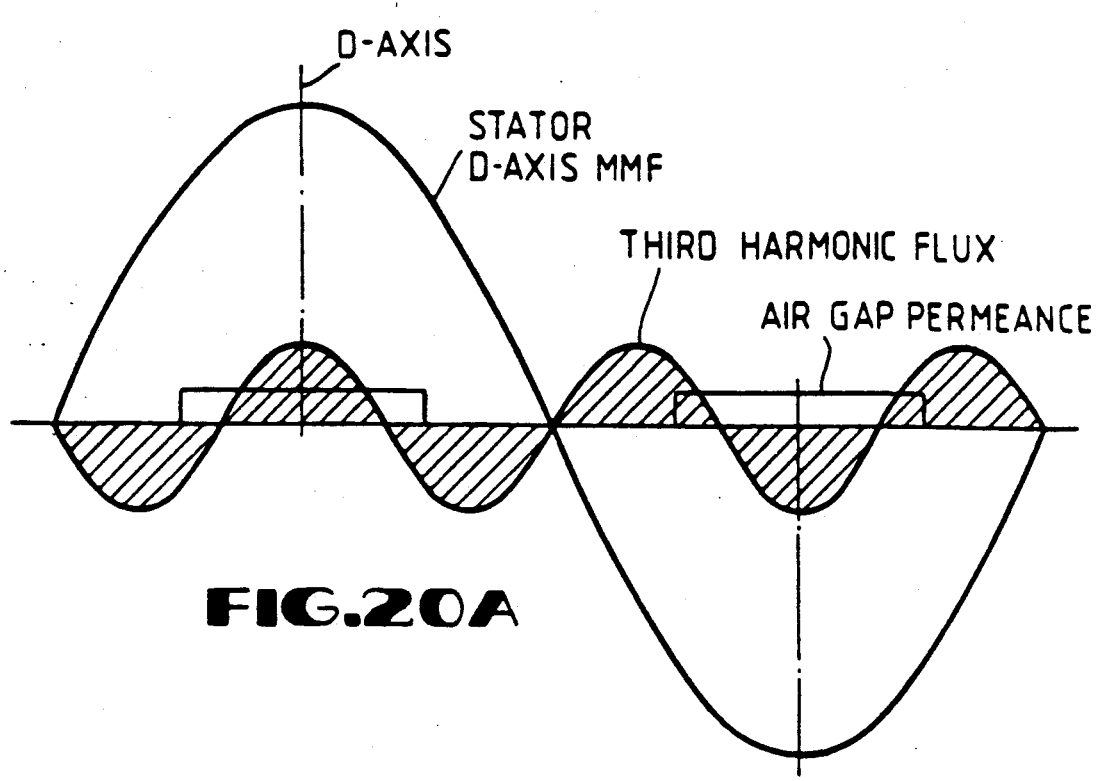
Figure 20B:
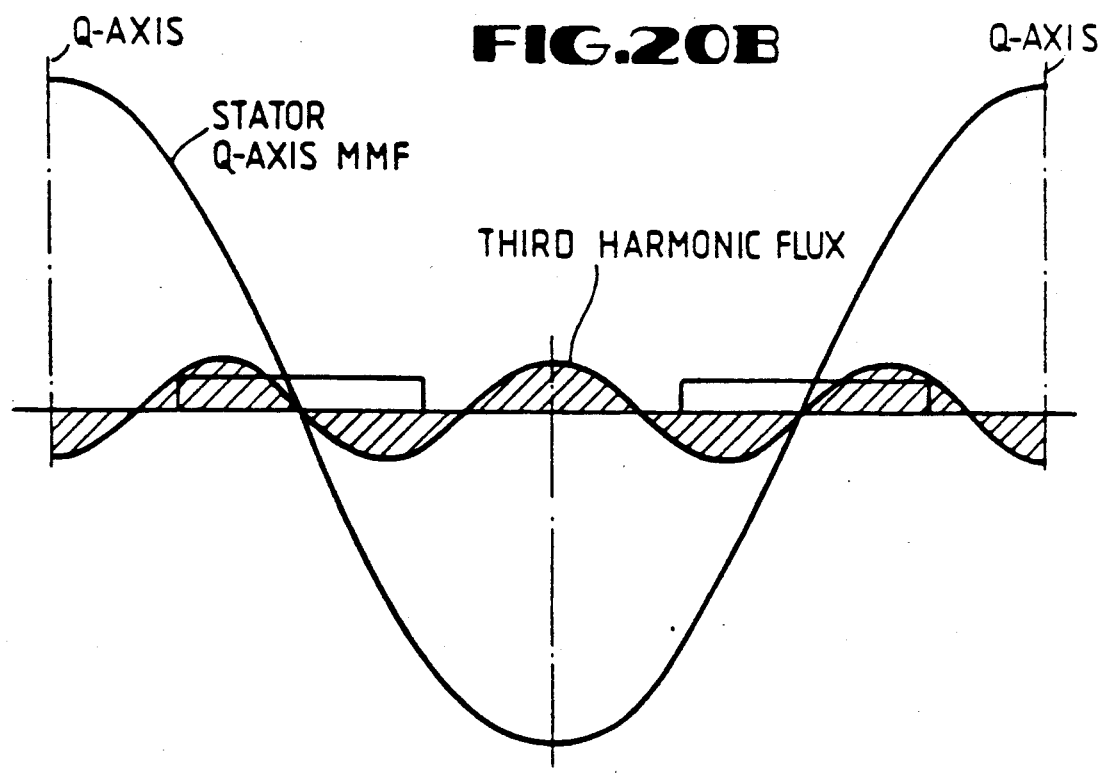

This fundamental flux wave generated by the stator excitation is composed of D and Q-axis components, as shown in FIGS. 20A and 20B. The air-gap permeance of a synchronous motor that employs the salient-pole rotor 100 is nonuniformly distributed and, in fact, is represented in FIGS. 20A-B as the square wave 106. Permeance is a magnetic principal analogous conductivity in electrical terms. In other words, permeance is the ability of a material to pass magnetic flux. Clearly, in the salient-pole rotor 100, the magnetic permeance is greatest at the pole faces 104.

Therefore, since the rotor 100 in a synchronous motor rotates in unison with the fundamental flux wave, the rotor faces 104, which represent the greatest permeance of the rotor 100, are synchronized with the D-axis component of the fundamental flux wave. Conversely, the Q-axis component of the fundamental flux wave is displaced 90 degrees from the D-axis component of the fundamental flux wave and, therefore, the zero crossing level of the Q-axis component of the fundamental flux wave coincides with the center of the pole face 104 or the center of the highest air-gap permeance 106.

The result of this nonuniform air-gap permeance is that the D and Q-axis components of the fundamental flux wave interact with the nonuniform air-gap permeance to respectively produce third harmonic waste flux waves, which are synchronized with their respective D and Q-axis components of the fundamental flux wave. These third harmonic flux waves are naturally-arising byproducts of synchronous motors that have heretofore not been used to enhance the torque of synchronous machines.

Figure 21B:
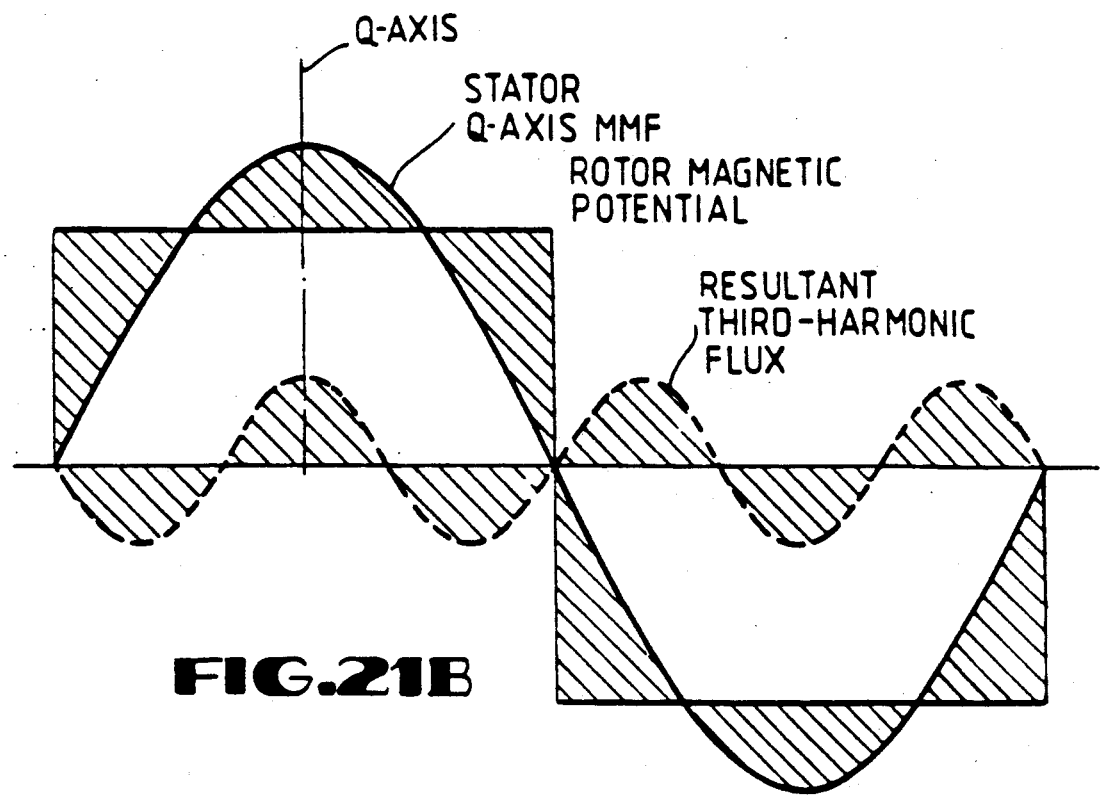
FIGS. 21A-B respectively depict a 2-pole segmental rotor and the relationship between the Q axis component of the fundamental flux wave, the rotor magnetic potential, and the resultant third-harmonic flux wave.
Figure 21A:
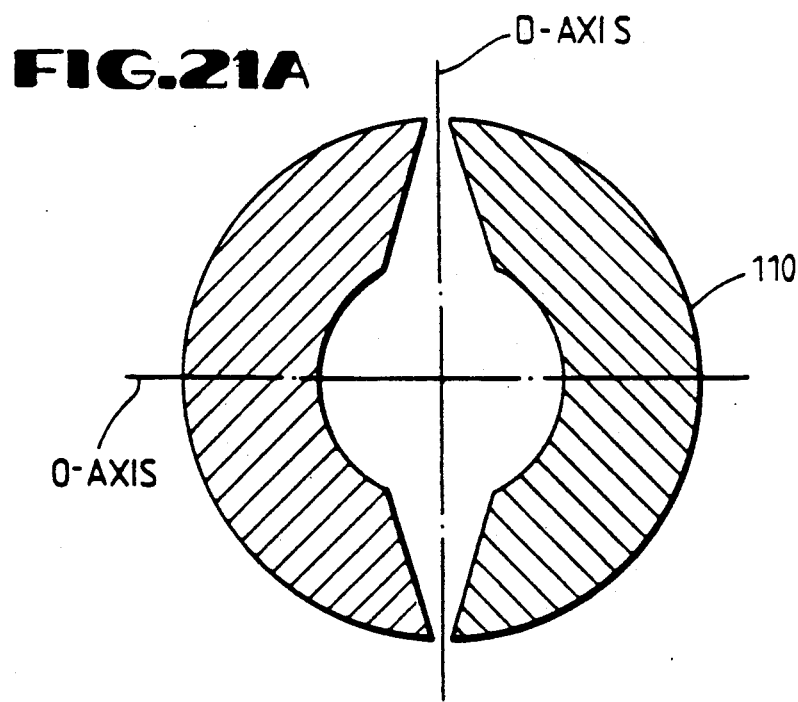

A similar affect is found in synchronous motors that employ segmental type motors. Referring now to FIG. 21A, a two-pole segmental rotor 110 is depicted. The segmental rotor 110 has a nonuniformly distributed rotor magnetic potential, much like the nonuniform air-gap permeance of the salient-pole rotor 100. This nonuniform rotor magnetic potential is represented in FIG. 21B as a square wave, which is synchronized with the Q-axis component of the stator flux wave. The interaction between the nonuniform rotor magnetic potential and the Q-axis component of the fundamental flux wave produces a third harmonic waste flux in a similar manner to that of the salient-pole rotor 100.

In either type of synchronous machine (salient-pole rotor or segmental rotor) this third harmonic waste flux is used to further enhance the torque of the synchronous motor by injecting a third harmonic excitation signal, which is phase controlled to interact with the third harmonic waste flux.

Figure 22A:
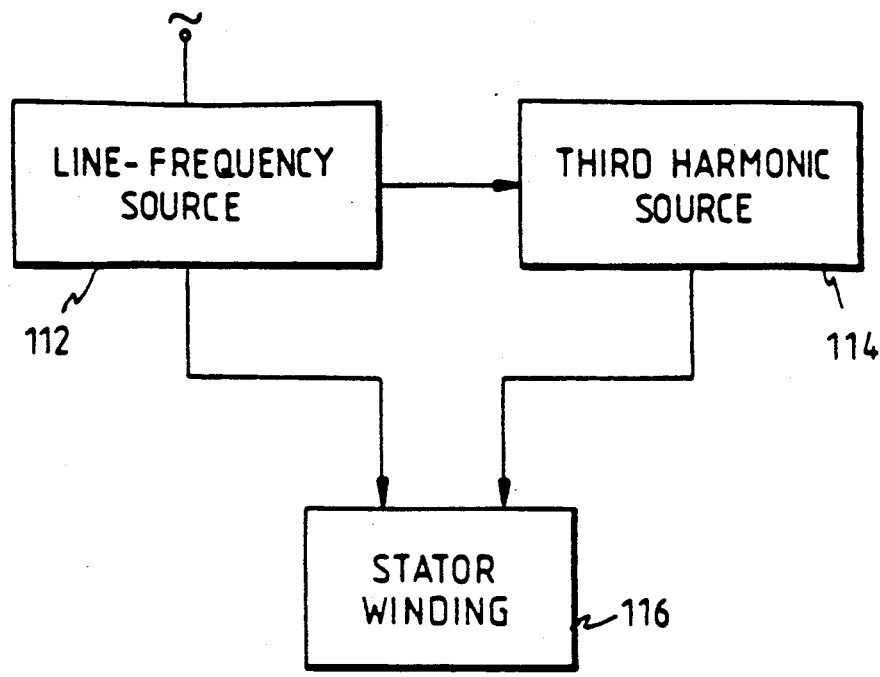
FIGS. 22A-B schematically depict two embodiments of the fundamental and harmonic excitation sources.
Figure 22B:
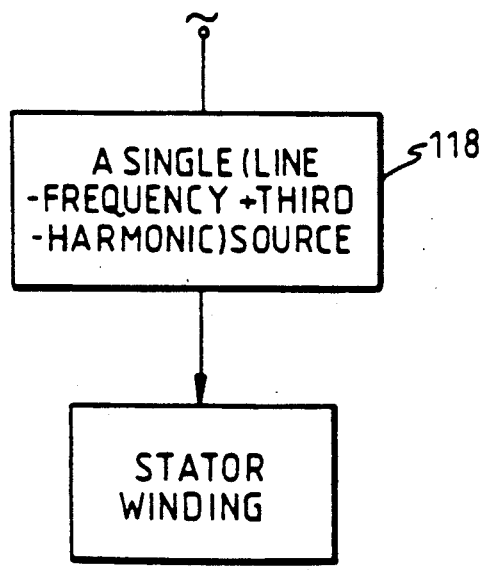

FIGS. 22A-B schematically depict two embodiments of a power source for injecting the fundamental and third harmonic excitation onto the stator winding of a synchronous machine. FIG. 22A shows separate electrical sources 112, 114 for the fundamental and third harmonic excitation signals. Both of these sources, 112, 114 are connected to the stator winding 116 of a synchronous motor.

Alternatively, FIG. 22B illustrates a single electrical source 118 for producing both the fundamental and third harmonic excitation signals. This alternative is particularly suited for an adjustable frequency drive, where both the fundamental and third harmonic power sources are generated by a single inverter.

As an example of FIG. 22A, FIG. 23 depicts the connection arrangement of a six-pole reluctance machine with a 36-slot stator winding. A three-phase, line-frequency power supply is fed through three volt amp balancers 120, 122, 124, which are described in greater detail in the discussion associated with FIGS. 8, 10, 13, 15, and 16.

The phase angle of the third harmonic current is preferably controlled in such a manner that the third harmonic rotating flux generated by the third harmonic excitation delivered to the stator windings leads the third harmonic waste flux while the machine is running as a motor. Conversely, the phase angle of the third harmonic flux wave, which is generated by the third harmonic excitation signal in the stator winding, is controlled in such a manner that it lags the third harmonic waste flux while the synchronous machine is running as a generator. As long as this principal applies, the instant invention is suitable for any number of poles and is not restricted to the number of poles or faces mentioned in the examples. Preliminary test data suggest that more than a 50% increase in pull-out torque is obtained from the implementation of the instant invention.

In order to achieve the desired flux distributions, depicted in FIGS. 1C or 1D and to inject a harmonic excitation that produces a flux wave that travels at the same rotational speed as the fundamental flux wave, several alternative stator winding structure are available. For example, in a first embodiment separate sets of polyphase windings for the fundamental and for each desired harmonic are provided. Each harmonic, thus, is applied to a discrete set of windings. Alternatively, and preferably, however, the fundamental winding is utilized also for harmonic excitation. This is accomplished in a variety of ways. For example, in one method of practicing the present invention, the outputs of two multiphase power supplies are coupled together in series to provide fundamental and harmonic excitation of the fundamental winding. Another method utilizes delta-connected windings coupled together through volt-amp balancers to balance the potential and currents of both fundamental and harmonic excitation in the windings. Yet another alternative method utilizes a single winding with a multiphase inverter, as is often found with adjustable speed devices, to inject the harmonic excitations onto the fundamental winding.

Figure 4:
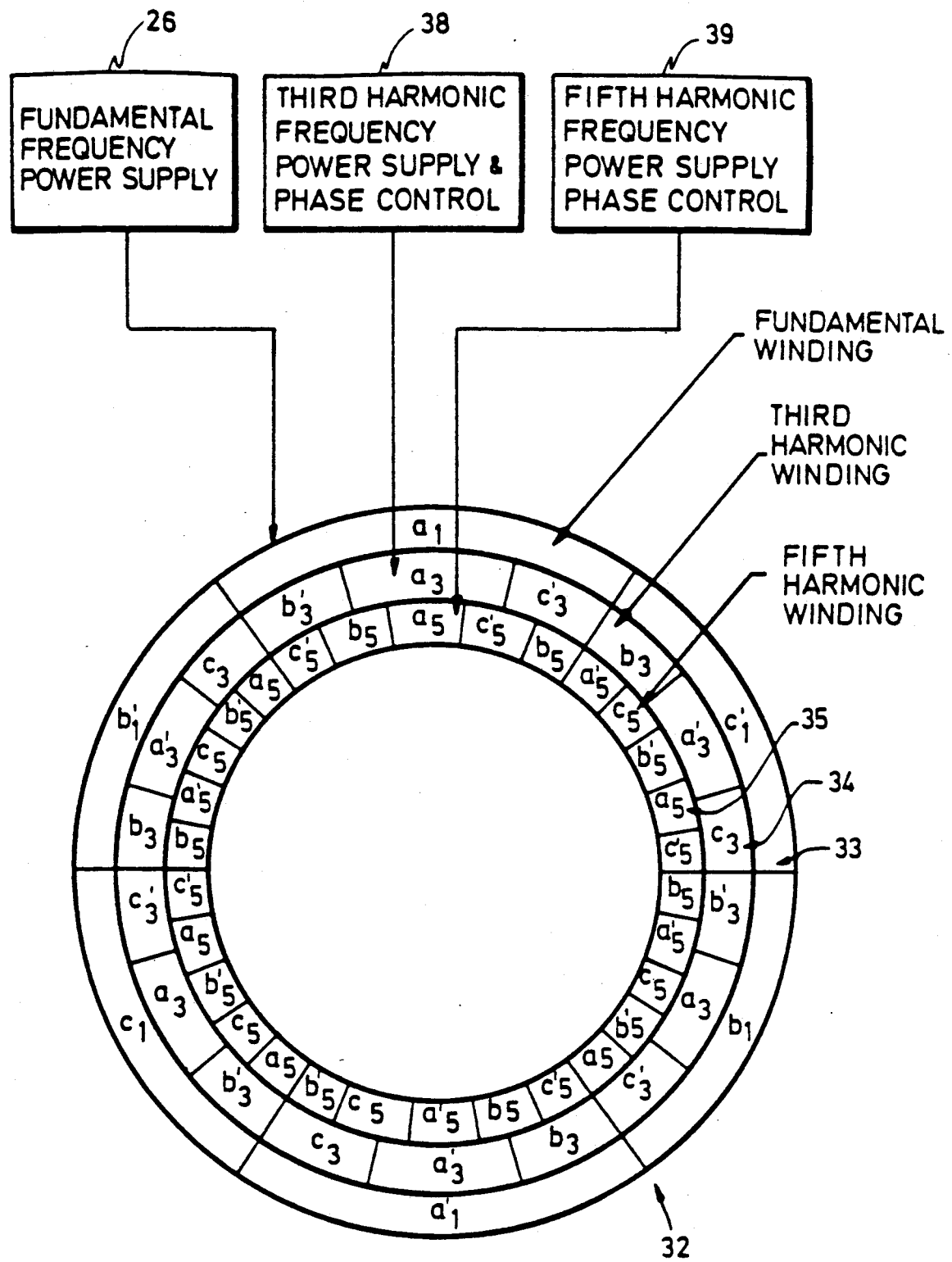
FIG. 4 schematically depicts the phase belts for a machine in accordance with the present invention having separate windings for fundamental, third harmonic and fifth harmonic frequencies and power supplies for exciting such machine.

Referring now to FIG. 4, therein is depicted in schematic form the cross section of phase belts for a machine 32 for excitation by fundamental, third harmonic, and fifth harmonic frequencies and the power supplies for exciting machine 32. Machine 32 is wound with a 2-pole, 3-phase fundamental winding 33 that is excited by fundamental frequency supply 26. Third harmonic winding 34 is a 6-pole, 3-phase winding that is excited by third harmonic frequency supply 38. Third harmonic frequency supply 38 contains phase control circuitry, as known in the art, to assure that the third harmonic frequency is maintained in the desired phase relationship with the fundamental frequency, as well as with the harmonic flux wave generated by the interaction between the fundamental flux wave and the rotor. Fifth harmonic winding 35 is a 10-pole, 3-phase winding that is excited by fifth harmonic frequency supply 39, which also contains phase control circuitry.

A specific phase winding in machine 32 extends between a pair of letters in a single winding ring, either 33, 34 or 35, indicated by that letter and its prime. For example, in the winding schematic the phase winding extending between a and a' in fundamental winding ring 33 is a single phase fundamental winding. Similarly, the third harmonic windings a to a' in winding ring 34 represent third harmonic phase belts. Pairs of third harmonic windings are connected either in series or parallel or are switched from one connection to the other for ease in starting.

As discussed above, in machine 32 each fundamental winding 33, third harmonic winding 34, and fifth harmonic winding 35 is excited by a separate three phase power supply 26, 38 and 39, respectively. As determined above, the frequency of the third harmonic excitation current is three times the fundamental frequency, and the frequency of the fifth harmonic excitation current is five times that of the fundamental frequency. The three frequencies are phase controlled to be synchronized with one another, as depicted, for example, in FIG. 1D or alternatively, to be phase related to the harmonic waste flux.

Each harmonic winding preferably has a number of poles ($P_h$) equal to:

$$P_h = np \qquad (1)$$

where:
n is the order of the harmonic (third, fifth, etc.); and
p is the number of poles in the fundamental winding.

For example, for an armature having a fundamental winding having four poles (p=4), the third harmonic winding has $3 \times 4 = 12$ poles. The fundamental winding is excited at the fundamental frequency w, and each harmonic winding is excited at its harmonic of the fundamental, i.e., a third harmonic winding is excited at the electrical frequency of 3 w. As is discussed in more detail herein, although the number of phases in the fundamental winding and in each harmonic winding are preferably two or more, the number of phases need not be the same for all windings.

This embodiment allows the greatest flexibility in choosing coil pitches and numbers of turns for the windings. This construction, however, requires that an armature slot is occupied by at least two different windings, thereby resulting in less efficient utilization of the slot area. Because of the less efficient utilization of the slot area by the multiple windings, this method typically results in less percentage improvement than do other methods, as are discussed later herein.

For two-phase systems, the displacement of the fundamental and third harmonic power supplies are 90 degrees. For three or more phase systems, the phase displacements of the fundamental and the harmonic frequency supplies are 360/n electrical degrees for n number of phases.

Because the number of poles for the fundamental winding automatically determines the number of poles for the space harmonic windings, in a machine where separate windings are provided for the fundamental and for the harmonic excitation currents, the appropriate number of phases for the harmonic excitation is determined by the number of slots per pole available for the harmonic windings. Table 1 indicates the slot requirements of both fundamental and third harmonic windings for polyphase machines:

TABLE 1

| PH$_f$ | S$_{pf}$ | S$_{pPHf}$ | PH$_3$ | S$_{p3}$ | S$_{pPH3}$ |
|---|---|---|---|---|---|
| 2 | 6 | 3 | 2 | 2 | 1 |
| 3 | 6 | 2 | 2 | 2 | 1 |
| 6 | 6 | 1 | 2 | 2 | 1 |
| 3 | 9 | 3 | 3 | 3 | 1 |
| 9 | 9 | 1 | 3 | 3 | 1 |
| 2 | 12 | 6 | 2 | 4 | 2 |
| 3 | 12 | 4 | 4 | 4 | 1 |
| 4 | 12 | 3 | 4 | 4 | 1 |
| 6 | 12 | 2 | 4 | 4 | 1 |
| 12 | 12 | 1 | 4 | 4 | 1 | where:

PH$_f$ indicates the number of phases of the fundamental frequency;

S$_{pf}$ indicates the slots per pole required for the fundamental winding;

S$_{pPHf}$ indicates the number of slots per pole per phase for the fundamental winding;

PH$_3$ indicates the number of phases of the third harmonic frequency;

S$_{p3}$ indicates the number of slots per pole required for the third harmonic winding; and S$_{pPH3}$ indicates the number of slots per pole per phase for the third harmonic winding.

Those skilled in the art recognize that in addition to the integral slot per pole per phase distributions indicated in Table 1, fractional slots per pole per phase may be utilized.

Figure 5:
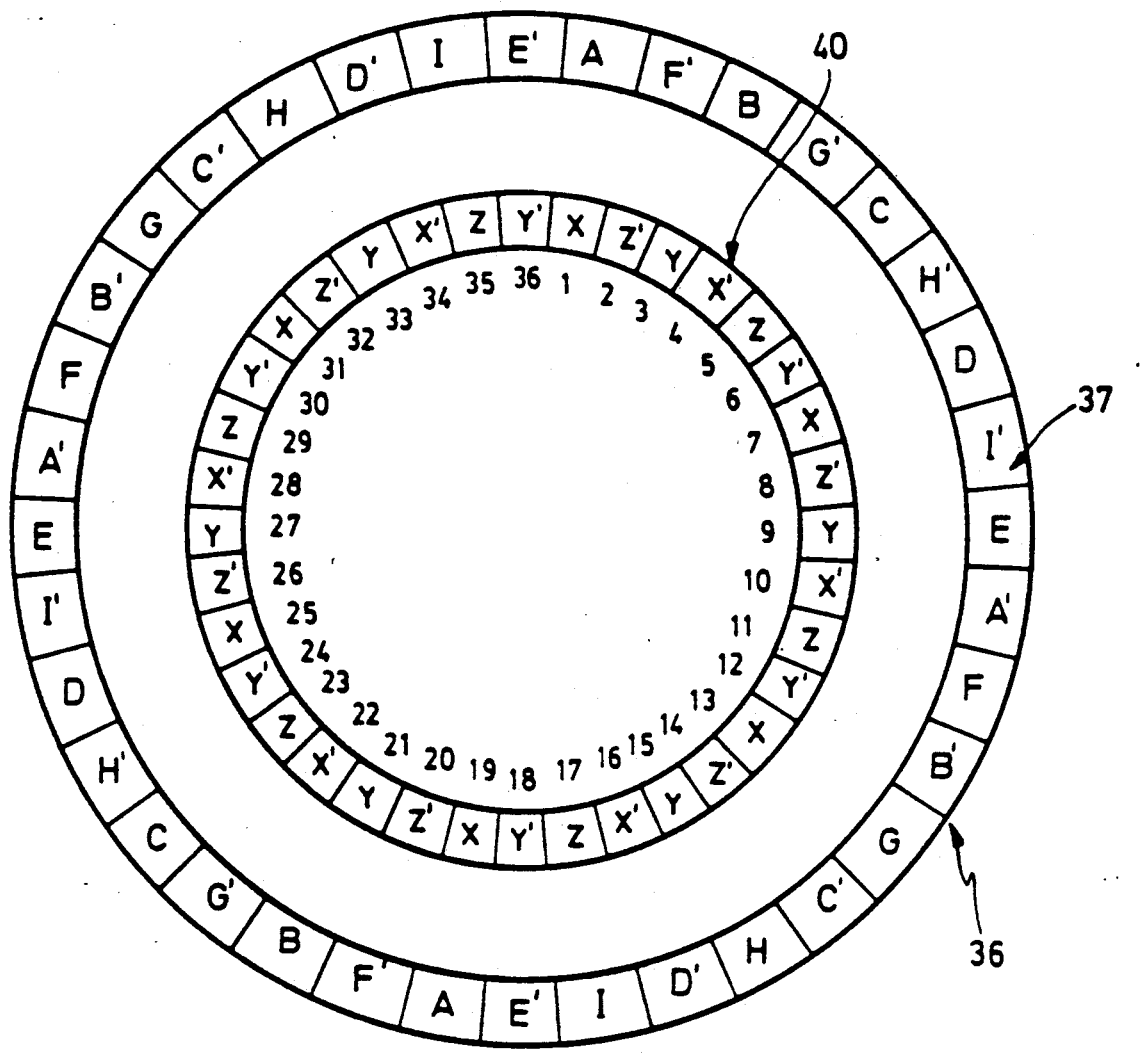
FIG. 5 schematically depicts a single layer winding for a machine in accordance with the present invention to be excited through combined fundamental and third harmonic power sources.

As indicated earlier herein, harmonic frequencies may be injected through use of a single winding for both fundamental and harmonic excitation. FIG. 5 schematically depicts in winding ring 37 a single layer winding for a four-pole, full pitch machine 36 having 36 slots. Machine 36 is preferably excited by balanced nine-phase fundamental current. Accordingly, as determined by equation 1, machine 36 has 3-phase, 12-pole third harmonic excitation. Fundamental windings are indicated by the pair of a letter and its prime, with a subscript indicating the slot position of the winding. For example, the winding between, A, in slot 1, and A', in slot 10, is designated as A$_1$-A'$_{10}$.

Figure 6:
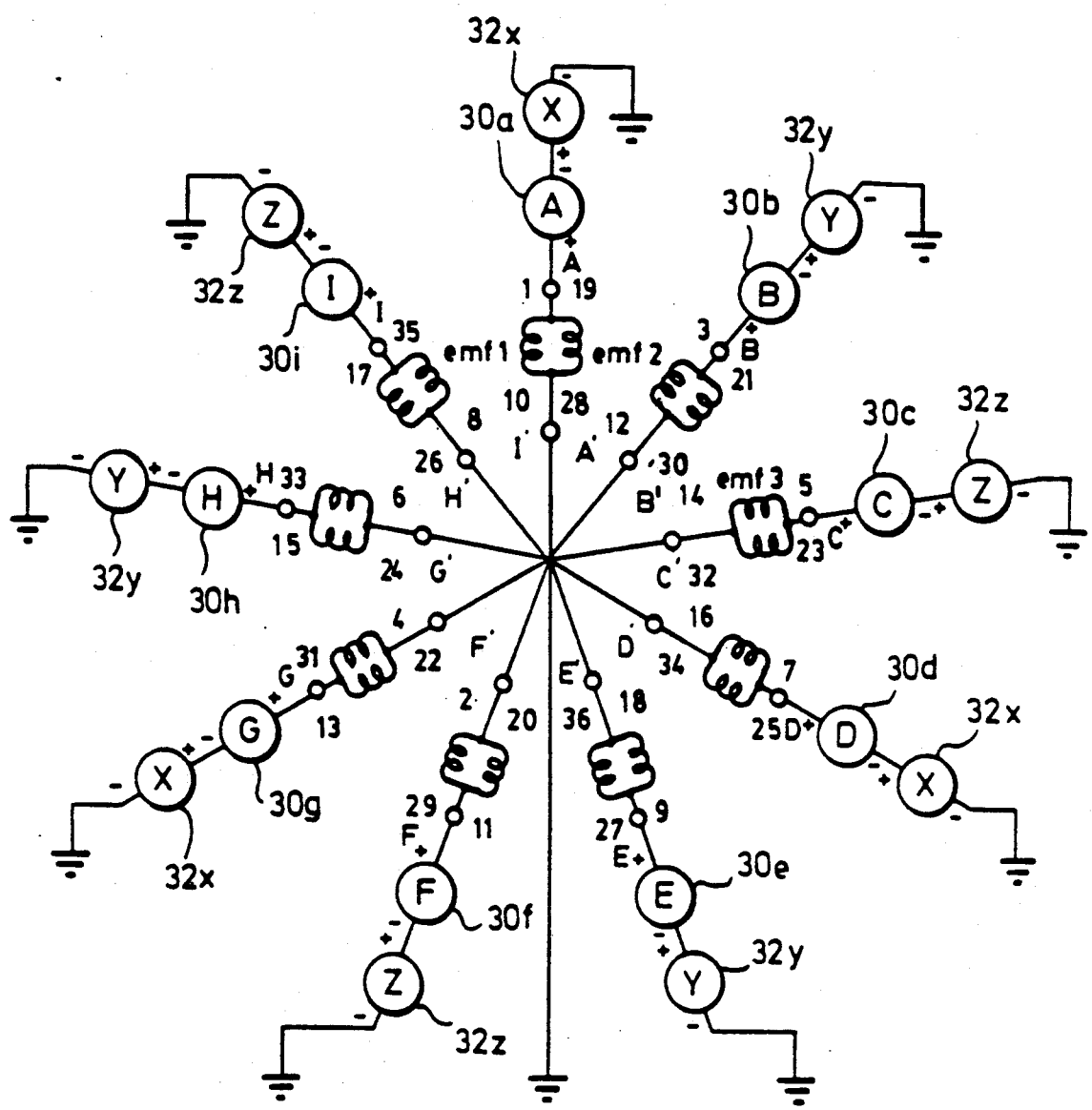
FIG. 6 depict the power source connections to the machine of FIG. 5.

FIG. 6 depicts the power supply connections to the indicated windings of machine 36 of FIG. 5. Transformer secondaries A-I, indicated as 30a, 30b, ... 30i, are the secondaries of one or more transformers coupled to an appropriate 9-phase fundamental frequency power supply. Those skilled in the art recognize that a balanced 9-phase fundamental frequency supply can be obtained from a 3-phase fundamental frequency supply through use of an appropriate number of transformers. Typically, 3 transformers, each with four appropriately wound secondaries, are used to construct such a 3-phase fundamental frequency supply.

Third harmonic frequency sources x-z, are preferably the secondaries of transformers 32x, 32y, and 32z, each coupled to one phase of a 3-phase third harmonic frequency power supply. Alternatively, however, the 3-phase third harmonic frequency power supplies are coupled directly to secondaries 30a-30i in the manner indicated.

In each arm of the star connection of FIG. 6, a secondary of the 3-phase third harmonic frequency power supply 32 is coupled between ground and a 9-phase fundamental frequency supply secondary 30, and to a pair of fundamental windings. The fundamental windings are identified by the slot numbers of machine 36 as indicated in FIG. 5. For example, as shown in FIG. 6, 3-phase secondary 32x is coupled in series between ground and 9-phase secondary 30a. The other side of 9-phase secondary 30a is then coupled to windings A$_1$-A'$_{10}$ and to A$_{19}$-A'$_{28}$.

In machine 36 of FIGS. 5 and 6, the winding pairs A$_1$-A'$_{10}$ and A$_{19}$-A'$_{28}$ are connected in parallel between 9-phase secondary 30A and ground. Alternatively, winding pairs A$_1$-A'$_{10}$ and A$_{19}$-A'$_{28}$ are connected in series with one another between 9-phase secondary 30a and ground. Such series connection approximately doubles the voltage required by machine 36 while halving the required current.

Ring 40 in FIG. 5 depicts the third harmonic phasers assigned to each slot of machine 36. The effective third harmonic excitations shown, (i.e., X$_1$-X'$_4$, X$_7$-X'$_{10}$; etc.) do not represent actual windings, but rather are symbolic of the third harmonic phaser distributions achieved through application of power as depicted in FIG. 6 to the fundamental windings arranged as in FIG. 5.

Figure 7:
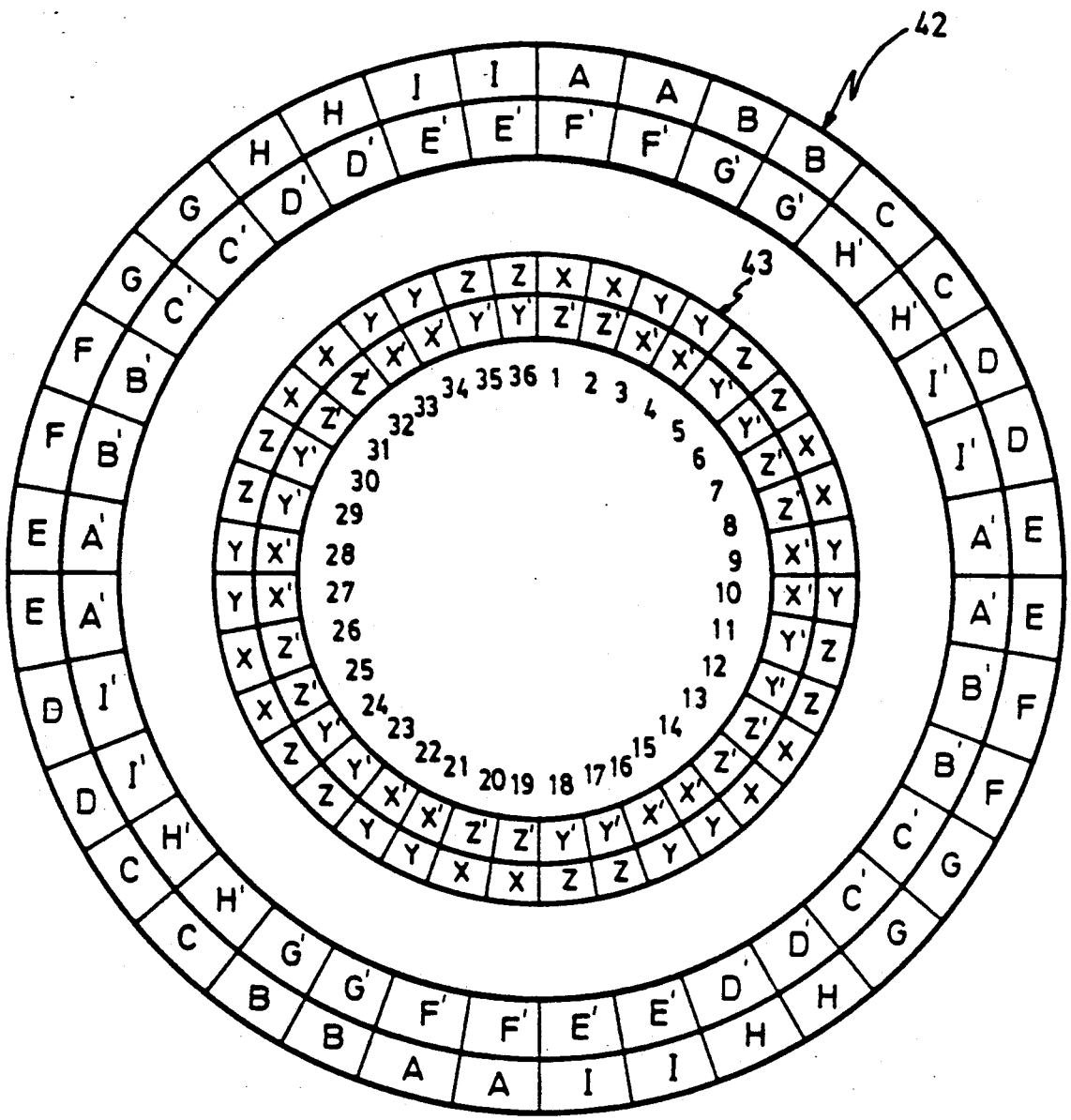
FIG. 7 schematically depicts a machine in accordance with the present invention having double layer windings with a per-unit pitch of less than 1.

The present invention is also employed using a multiple layer winding as opposed to the single layer winding utilized with machine 36 in FIGS. 5 and 6. The winding connections for a machine 42 with a double layer winding are schematically depicted in FIG. 7. Additionally, the principles of the present invention are readily applicable to a machine having less than a full pitch winding.

As indicated above, machine 36 of FIGS. 5 and 6 is a four-pole, thirty-six slot, full-pitch machine. A full-pitch machine is preferable for use with the present invention because an optimal increase in machine performance is realized through practice of the invention with a full pitch machine. However, those skilled in the art realize that the fundamental excitation of some full pitch machines is more prone to generate undesirable fifth and seventh harmonics. As discussed earlier herein, these harmonics are responsible for hindering machine performance. The coil pitch of a conventional machine is, therefore, often designed to be 0.83, so as to minimize these undesirable fifth and seventh space harmonics.

The fundamental coil pitch factor is determined by the relationship:

$$\cos[(\text{full pitch} - \text{actual pitch})/\text{full pitch} \times 180/2] \quad (2)$$

The third harmonic coil pitch factor for a single winding is determined by the relationship:

$$\cos[(\text{full pitch} - \text{actual pitch})/\text{full pitch} \times 3 \times 180/2] \quad (3)$$

Table 2 indicates the pitch factors for both the fundamental and the third harmonic for a double layer winding as determined through use of equations 2 and 3.

TABLE 2

| Actual pitch | Per-Unit Pitch | Fundamental Pitch Factor | 3rd Harmonic Pitch Factor |
|---|---|---|---|
| 9 slots | 1.00 | 1.00 | 1.00 |
| 8 slots | 0.89 | 0.98 | 0.87 |
| 7 slots | 0.78 | 0.94 | 0.50 |
| 6 slots | 0.67 | 0.87 | 0.00 |

FIG. 7 depicts a 36 slot machine 42 having a four-pole fundamental and a twelve-pole third harmonic winding, but with a 0.89 per unit pitch and a double layer winding. Windings are represented in FIG. 7 in the same manner as with FIG. 5, i.e., windings are represented by pairs A$_1$-A'$_9$; B$_3$-B'$_{11}$, etc. Phase windings in adjacent pairs slots, for example A₁-A'₉ and A₂-A'₁₀ are connected in parallel. Inner ring 43 does not represent actual windings of machine 42, but rather, the third harmonic phase distribution of machine 42. Machine 42 is excited by power connections similar to those depicted in FIG. 6 for machine 36, with the addition of additional connections to the dual windings in each slot of machine 42.

A third method of practicing the present invention involves the use of volt-amp balancers. This method allows the use of 3-phase power supplies to provide the fundamental and third harmonic excitation. With this method the machine windings are delta-connected. One phase of the 3-phase third harmonic excitation current is coupled to each delta. Each leg of each delta preferably contains the secondary of a transformer (54a, 54b, 54c; 56a, 56b, 56c; 58a, 58b, 58c in FIG. 10), each of which has a primary coupled to one phase of the third harmonic frequency power supply. As previously discussed, the frequency of the third harmonic excitation current is three times that of the fundamental excitation current.

Autotransformers used in the volt-amp balancers of the power connections for this method preferably yield variations of resistance and leakage-reactance between full load on the machine and no load. However, for purposes of illustration of this embodiment, ideal conditions are assumed, in which the excitation current, the leakage reactances, and the resistances of both the volt-amp balancers and the third harmonic transformers are neglected. Under this assumption, the terminal voltage of a winding is equal to the back emf produced by the fundamental air-gap flux. These ideal conditions assumed are generally representative of a no load condition of a large rating machine, whose no load currents are typically small compared to their full load currents.

Figure 8:
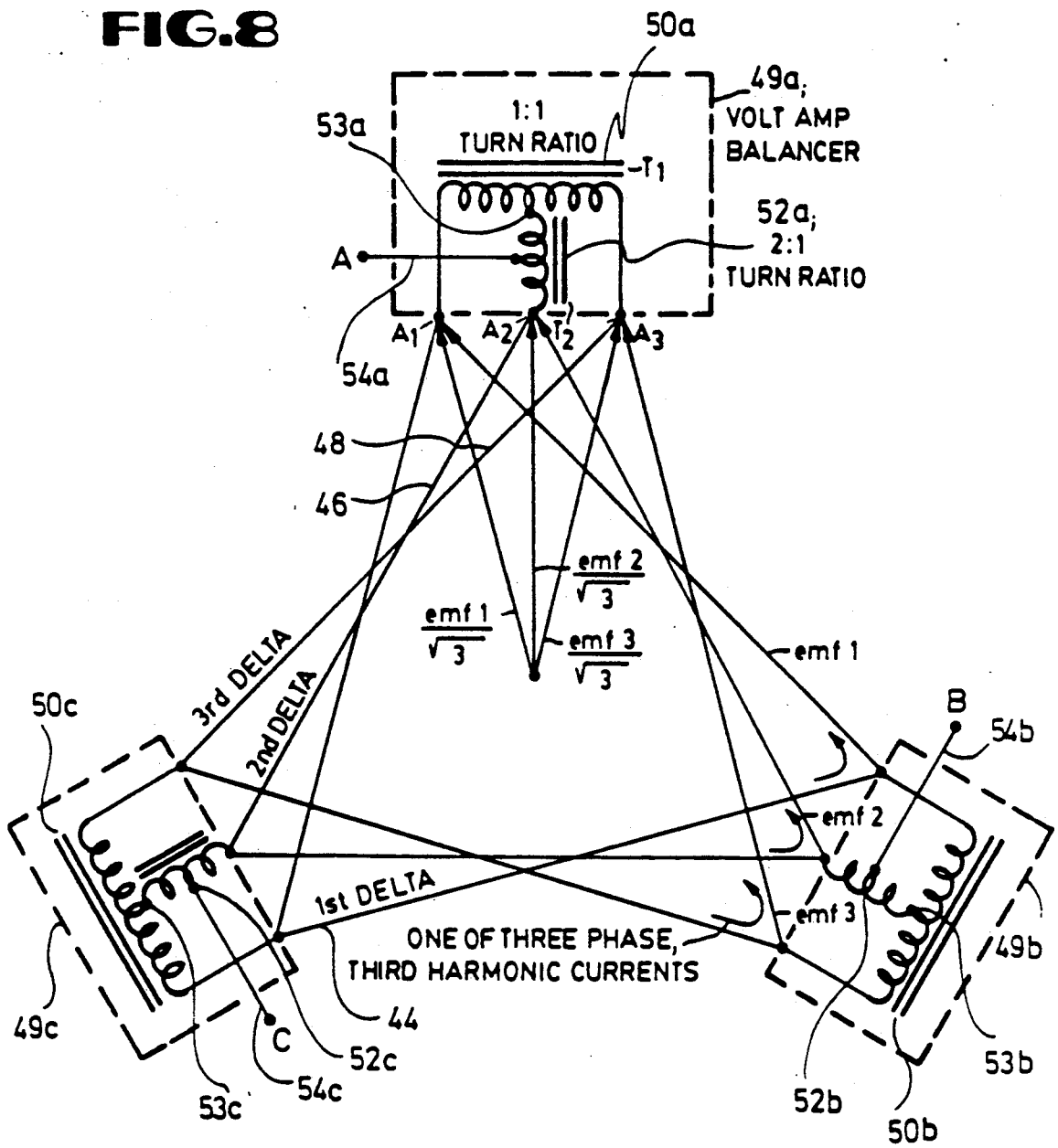
FIG. 8 depicts the connections and the back emf potential points for a machine when such machine is excited through use of volt-amp balancers.
Figure 9:
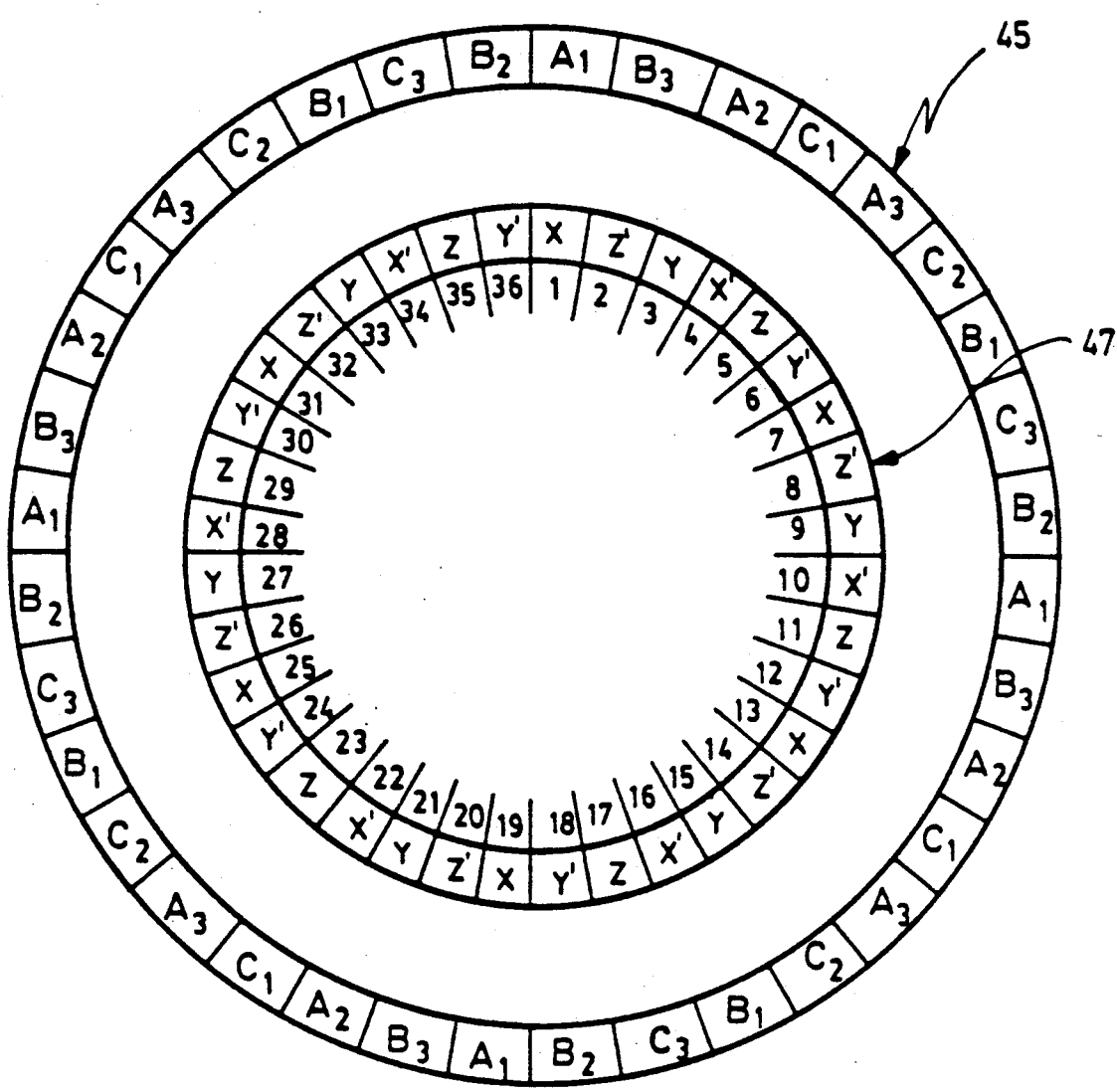
FIG. 9 depicts the slot electrical connections for a machine to be excited as in FIG. 8.
Figure 10:
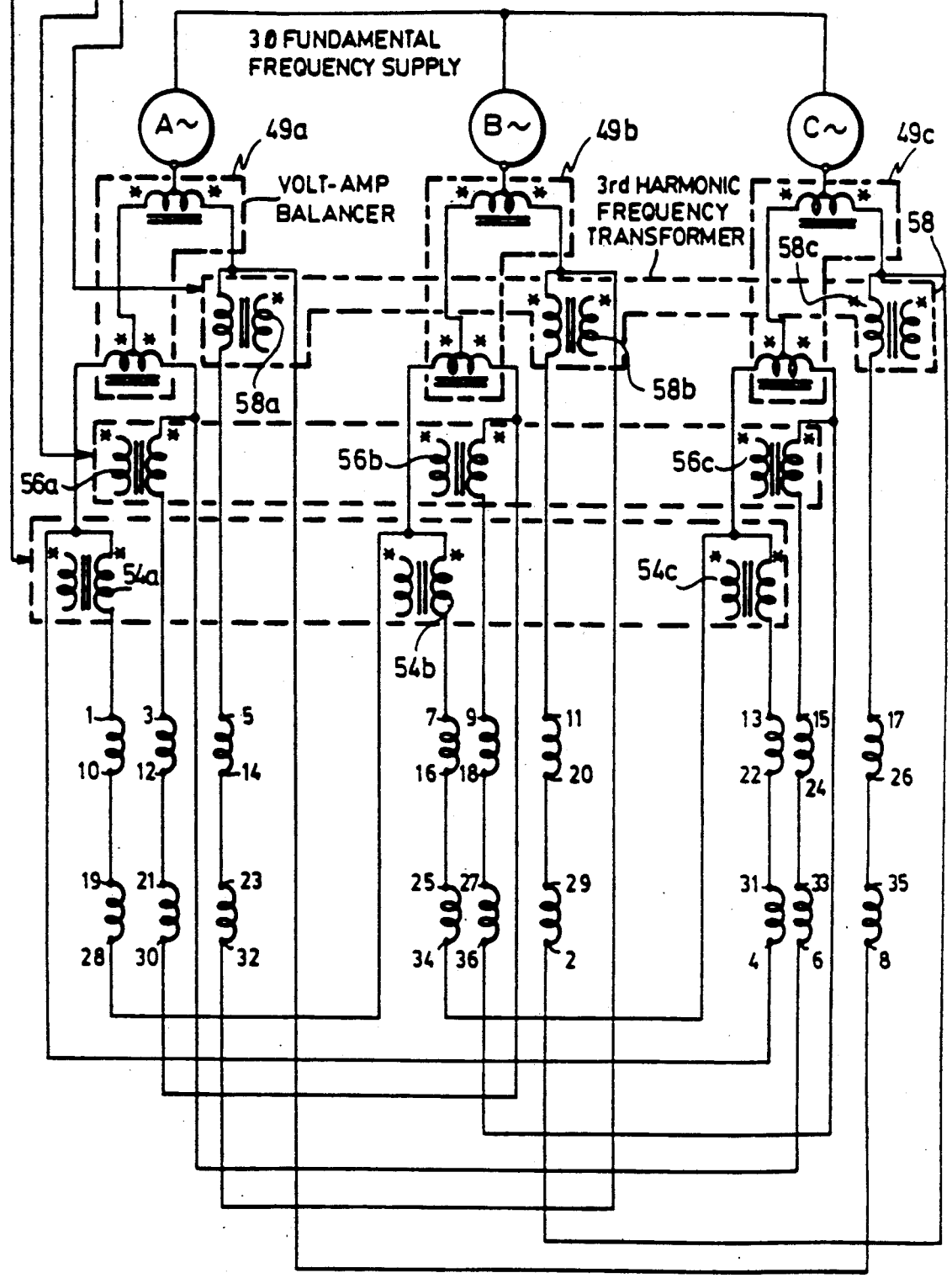
FIG. 10 schematically depicts the connections for the machine of FIGS. 8-9.

FIG. 8 depicts the connections and the back emf potential points (A₁, A₂, and A₃) for exciting a machine 45, as depicted in FIG. 9. Machine 45 is a four-pole, 3-phase machine, having 36 slots and 120~ phase belts. FIG. 10 schematically depicts the particular slot electrical connections for the connections depicted in FIG. 8. Inner ring 47 of FIG. 9 depicts the third harmonic phaser distribution of machine 45 when machine 45 is excited through the connections as shown in FIGS. 8 and 10.

With this volt-amp balancer method of harmonic injection, the number of phases of the third harmonic is determined by the number of slots per third harmonic pole by means of the relationship:

$$N_{ph3} = \text{the smallest multiplier greater than 1 of} \quad [n_3/(3 \times P_1)] \quad (4)$$

where:
$N_{ph3}$ equals the number of third harmonic phases;
$n_s$ equals the number of slots in the machine; and
$P_f$ equals the number of poles of the fundamental frequency.

In machine 45 coupled as depicted in FIGS. 8 and 10, 120~ phase belt slots 1, 3 and 5, etc. correspond to the three discrete phases of third harmonic excitation. Each phase of the 3-phase third harmonic current is a zero-sequence current with respect to a particular fundamental delta winding. The back emf's (emf 1, emf 2, and emf 3) of the fundamental frequency (in slots 1, 3 and 5, etc.) each have the same amplitude. Because the phases of these three currents are different, coils in slots 1, 3 and 5, etc. can not be directly connected, either in parallel or in series.

In the connections of FIG. 8, three volt-amp balancers 49a, 49b, and 49c are used, one for each phase of the fundamental frequency current. Each volt-amp balancer is formed of two autotransformers: T1, indicated as 50a, 50b and 50c, and T2, indicated as 52a, 52b and 52c. The turn ratio of transformers T1 (50a, 50b and 50c), is 1:1. The turn ratio of each transformer T2 (52a, 52b and 52c), is 2:1. The sides of each transformer T1 are connected to a terminal potential point A1 or A3 of first delta 44 or third delta 48, respectively. Autotransformer T2 is connected between terminal potential point A2 of second delta 46 and the center tap 53 of its respective transformer T1. Line current of phase A is coupled to the tap 54a, of autotransformer T2, 52a.

Because the turn ratio of autotransformer T2 is 2:1 one portion to terminal A2 of second delta 46 and two portions into center tap 53a of transformer T1, 50a. Similarly, because the turn ratio of each autotransformer (T1) 50a, 50b and 50c is 1:1, the current into the terminal potential point A3 of third delta 48 is the same as that going into the terminal potential point A1 of first delta 44. Accordingly, the line currents entering terminal potential points A1, A2 and A3 of first, second and third deltas 44, 46, and 48, respectively are identical. As a result, the phase current drive is identical for each phase.

In operation of the embodiment depicted in FIGS. 8-10, the back emf's at terminal points A1 and A3 are balanced by transformers (T1) 50a, 50b and 50c. The potential at terminal potential point A2 and at the center top of autotransformer T1 and balanced by each autotransformer T2, 52a, 52b and 52c. As indicated above, each third harmonic current appears as a zero-sequence current relative to a particular fundamental current. Accordingly, the volt-amp balancers see only the fundamental frequency currents and voltages. The back emf voltages are, therefore, maintained in the same amplitudes, but in different phases, through operation of volt-amp balancers 49a, 49b, 49c. The net effect of this connection is that the flux wave produced is the same as that which would be produced with the coils of slots 1, 3 and 5 connected in series.

Figure 11:
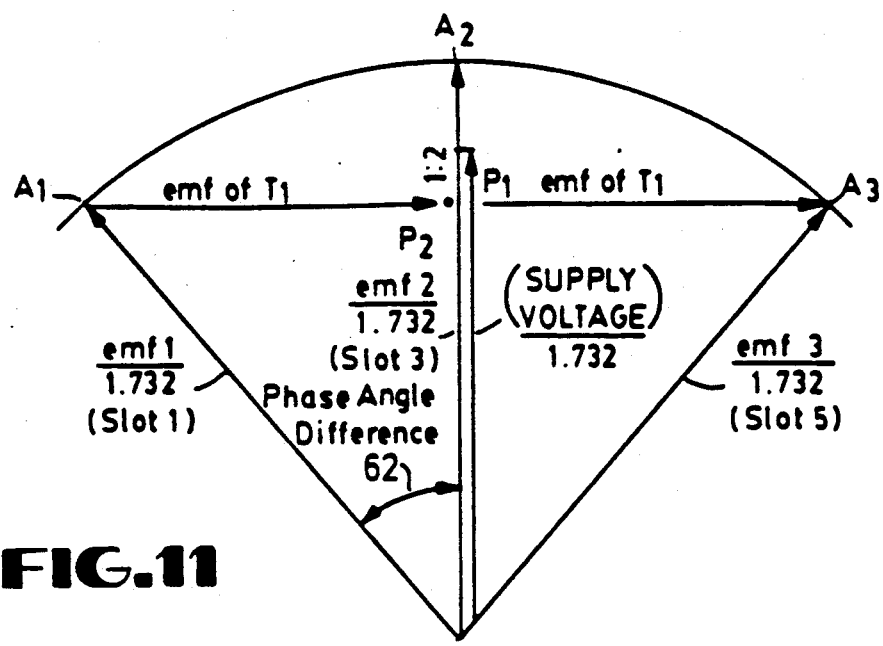
FIG. 11 depicts the fundamental frequency back emf voltage differences between harmonic phases found in alternate slots in the machine of FIGS. 8-10.

The fundamental frequency back emf voltage difference between the harmonic phases found in alternate slots (slots 1, 3 and 5, etc.) are related as shown in the vector diagram of FIG. 11. As can be seen in FIG. 11, the back emf's in each delta 44, 46, 48 are of equal magnitude, but have a phase angle difference of 40~. The volt-amp balancers balance these phase differences, which occur between alternate slots in machine 45. As one skilled in the art can calculate, the total volt-ampere rating of volt-amp balancers 49a, 49b and 49c, is 0.37 times that of the transformers required to provide the 9-phase fundamental frequency supply discussed in relation to the system of FIGS. 5 and 6. The results actually achieved with a machine excited through use of volt-amp balancers depart somewhat from the ideal performance shown and described. This departure is due in large part to winding resistance and leakage reactance in the volt-amp balancers and harmonic frequency transformers. Accordingly, in the design of components for any particular system, the transformers for the volt-amp balancers and third harmonic excitation are designed with sufficiently low winding resistance and leakage reactance to minimize departure from the ideal.

Figure 12:
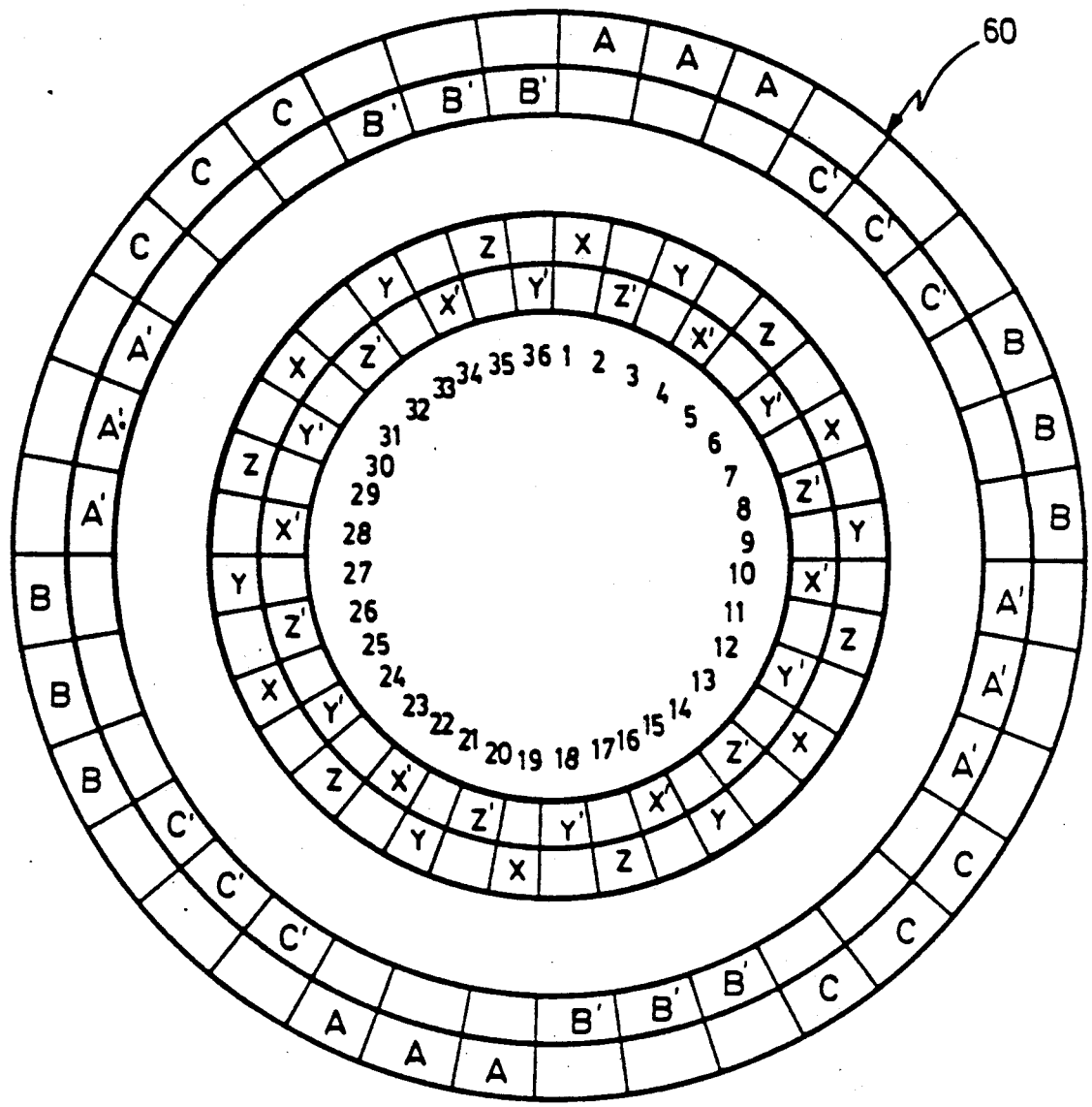
FIG. 12 schematically depicts a machine with 60~ phase belt connections for excitation through use of volt-amp balancers.
Figure 13:
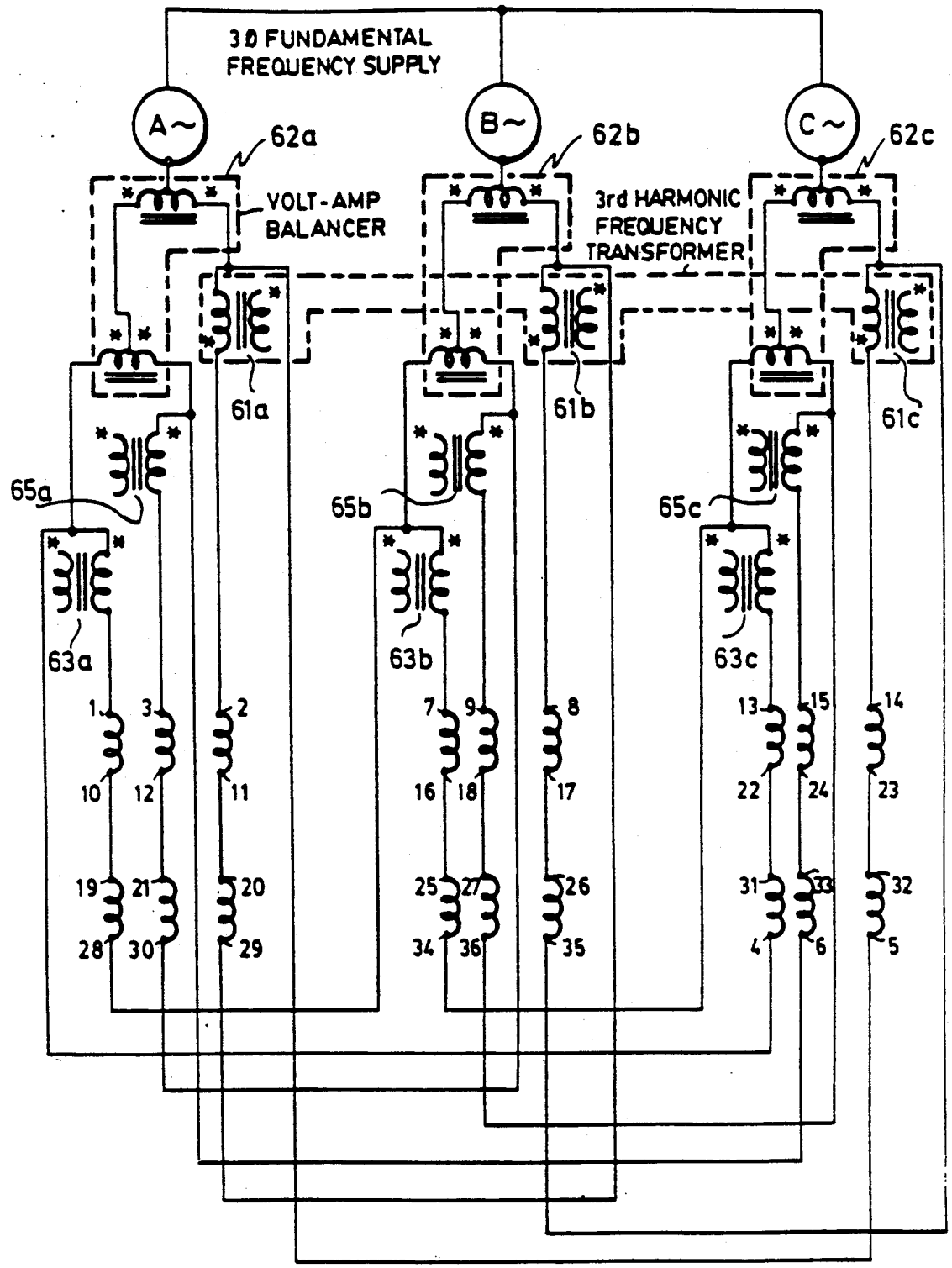
FIG. 13 schematically depicts the electrical connections for the machine of FIG. 12.

FIG. 12 depicts another embodiment of this method of harmonic injection into a four-pole, thirty-six slot machine 60, with windings corresponding to a 60~ phase belt connection. The actual connection diagram for machine 60 is depicted in FIG. 13. As can be seen in FIG. 13, the polarity of each third harmonic transformer 61a, 61b, 61c coupled to the delta in slot 2 is reversed 63a, 63b, 63c; 65a, 65b, 65c, coupled to the deltas in slots 1 and 3. The volt-ampere rating of the three volt-amp balancers 62a, 62b and 62c of FIG. 13 is 0.18 times that of the transformers required to provide the 9-phase supply discussed in reference to the system of FIGS. 5 and 6. The volt-ampere rating of the balancers is, therefore, substantially less even than that of the system of FIGS. 8–10 having 120~ phase belt connections.

Figure 14:
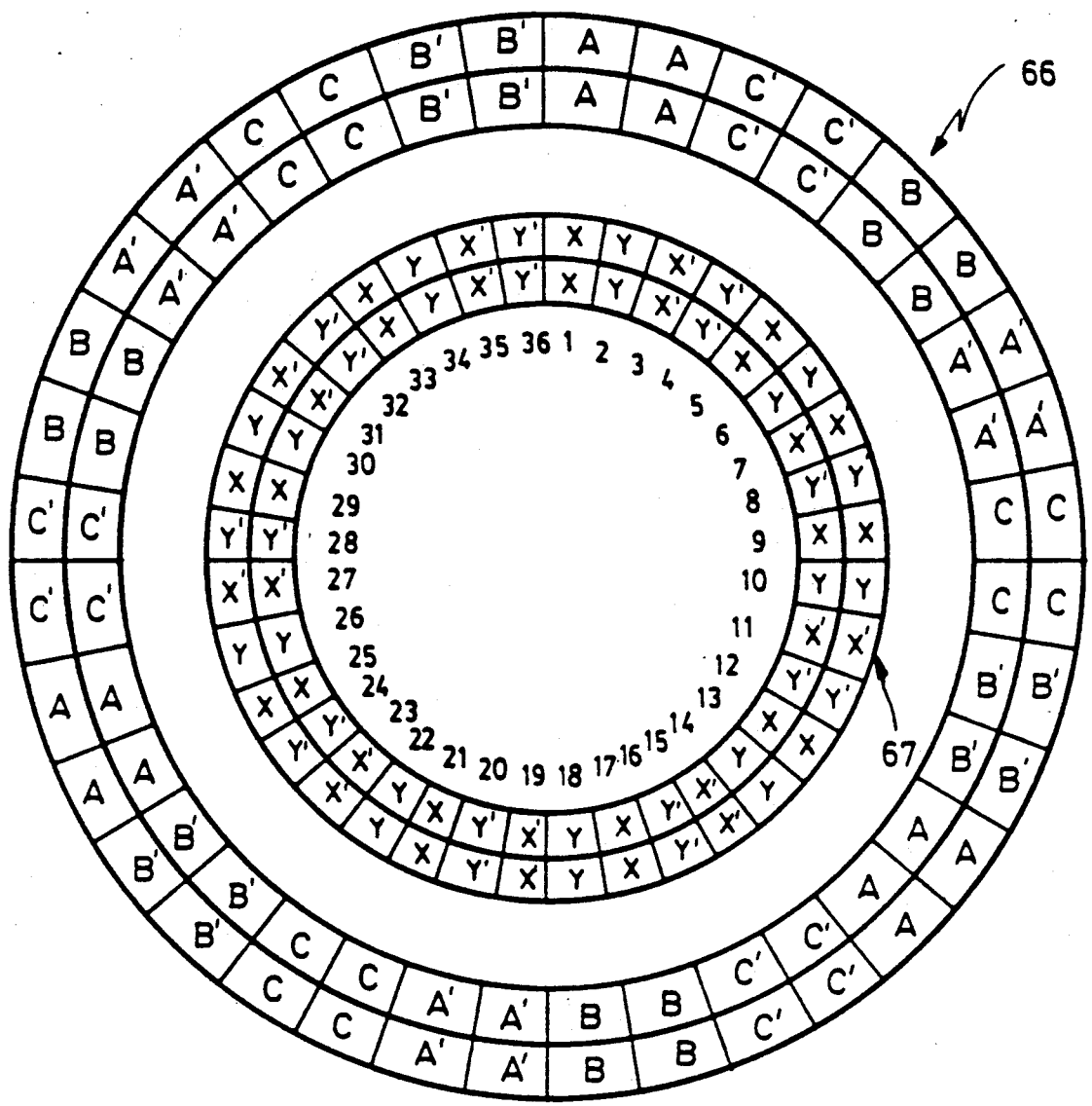
FIG. 14 schematically depicts the windings of an alternative embodiment of a machine to be excited through use of volt-amp balancers.

Another example of the present invention is illustrated through use of an ideal machine having two third harmonic phases FIG. 14 schematically depicts a 3-phase, full-pitch, double-layer winding, six-pole fundamental, 36 slot machine 66. The number of slots per third harmonic pole is: $36/(3 \times 6) = 2$. Referring to equation 4, because 2 is the smallest multiplier of 2 other than 1, the number of phases of the third harmonic excitation is 2. Ring 67 depicts the third harmonic phase distribution for machine 66.

Figure 15:
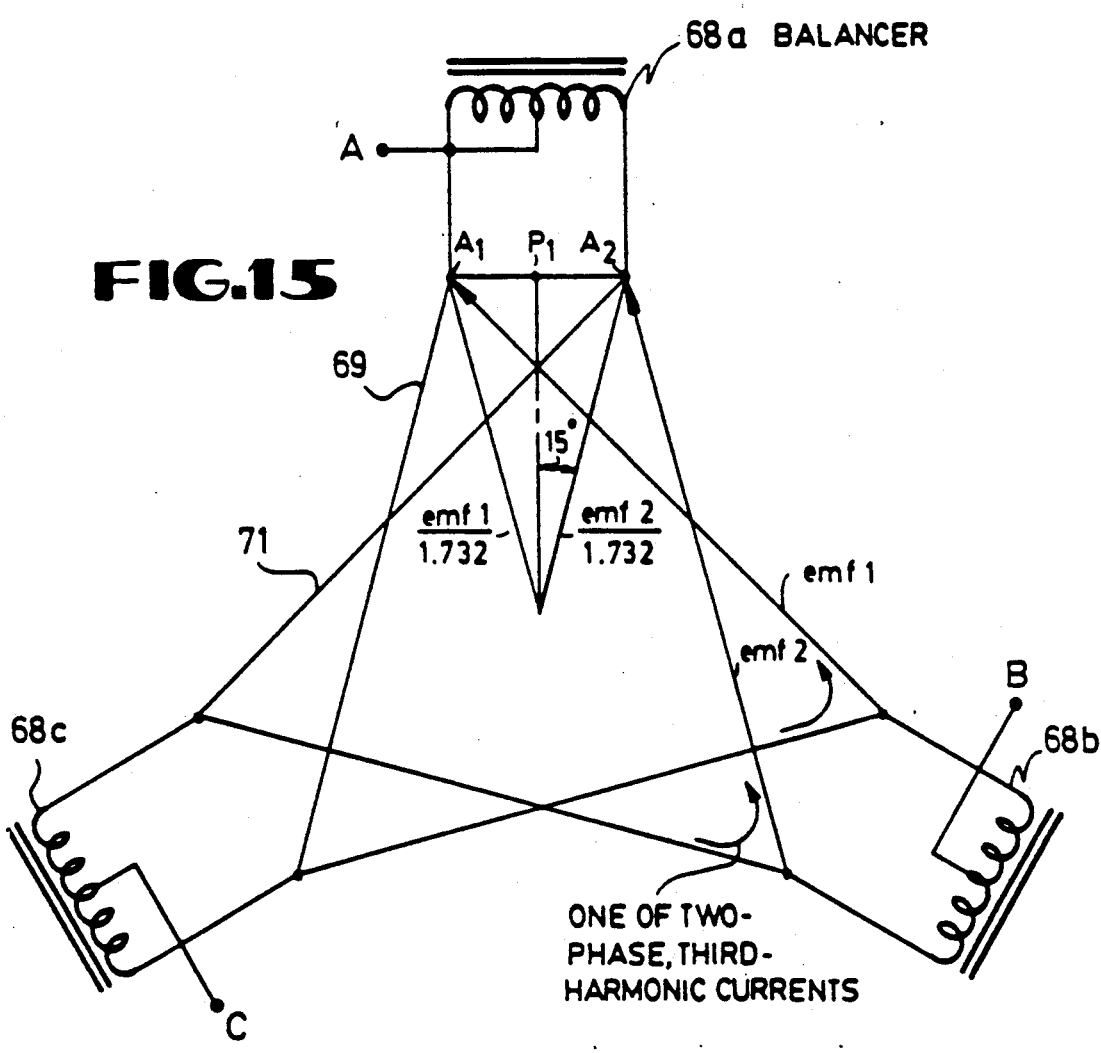
FIG. 15 schematically depicts the connections and the fundamental frequency back emf potential points for the machine of FIG. 14.
Figure 16:
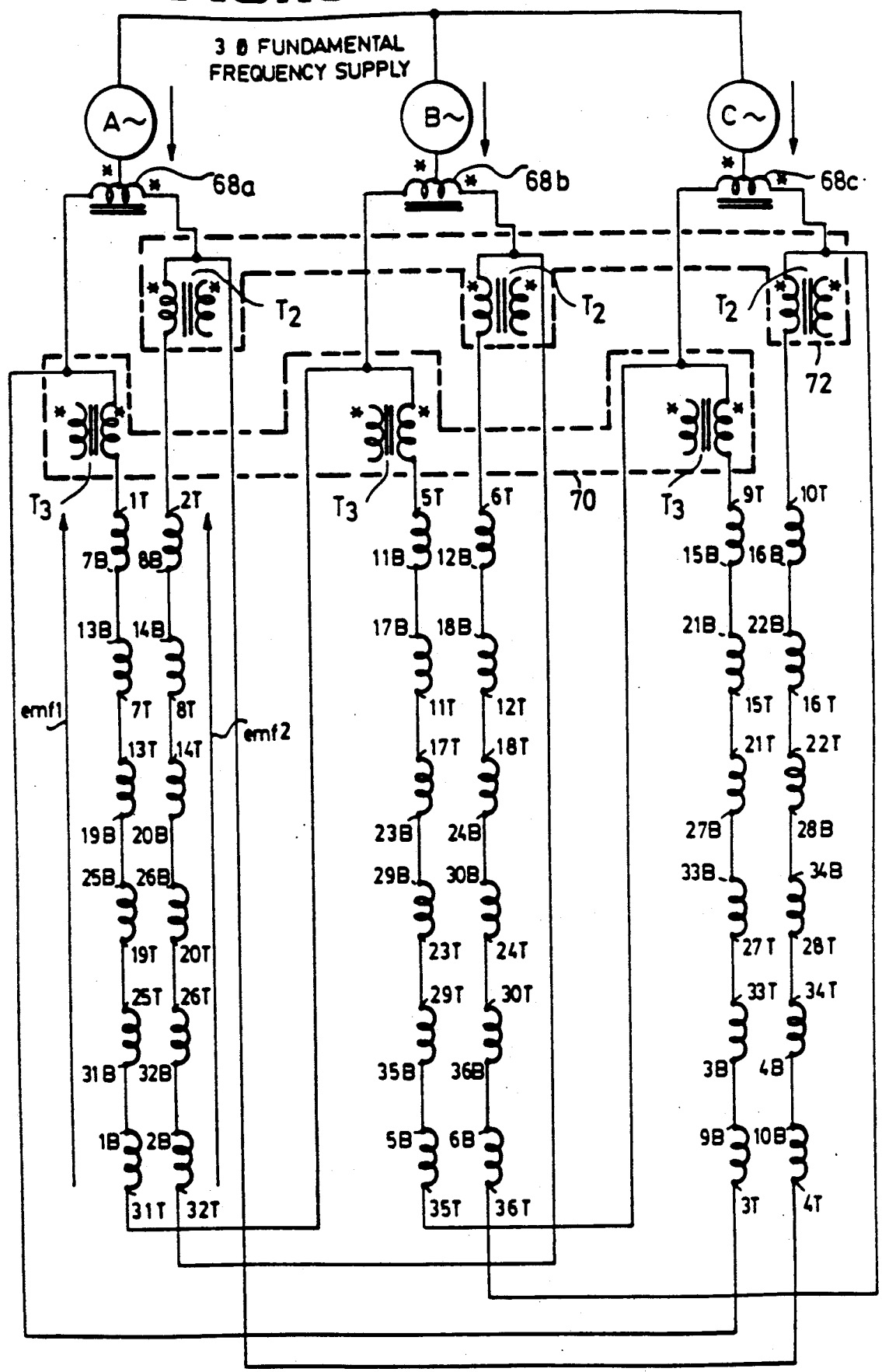
FIG. 16 schematically depicts the electrical connections for the machine of FIGS. 14 and 15.

Referring now also to FIGS. 15 and 16, the windings of machine 66 are connected in two deltas 69, 71. FIG. 15 depicts the winding fundamental frequency back emf potential points (A1 and A2), corresponding to the connection of the volt-amp balancers 68a, 68b and 68c of FIG. 16. In the machine of FIGS. 14–16, the total volt-amp rating of the three volt-amp balancers is 0.26 times that of the transformers that would be needed to supply the fundamental frequency excitation through use of a 3-phase fundamental frequency supply as discussed in reference to FIGS. 5 and 6. One phase of the third harmonic excitation is applied to each leg of a delta through transformers, as depicted at 70 and 72 in FIG. 16.

Because the third harmonic excitation of machine 66 is two phase, one autotransformer is used for each volt-amp balancer 68a, 68b, 68c. FIG. 16 schematically depicts a detailed connection diagram for exciting machine 66. Each third harmonic frequency supply transformer 70, 72 supplies one of the two phases of the third harmonic excitation current. Each transformer 70, 72 preferably includes a single primary and three equivalent secondaries, coupled in the deltas as shown. As is well known in the art, because each secondary carries one phase of the fundamental frequency current, the mmf's of these fundamental frequency currents add to zero and no fundamental frequency current is induced in the primary of the third harmonic transformers. This is true of all third harmonic transformers in all other embodiments described herein.

Figure 17:
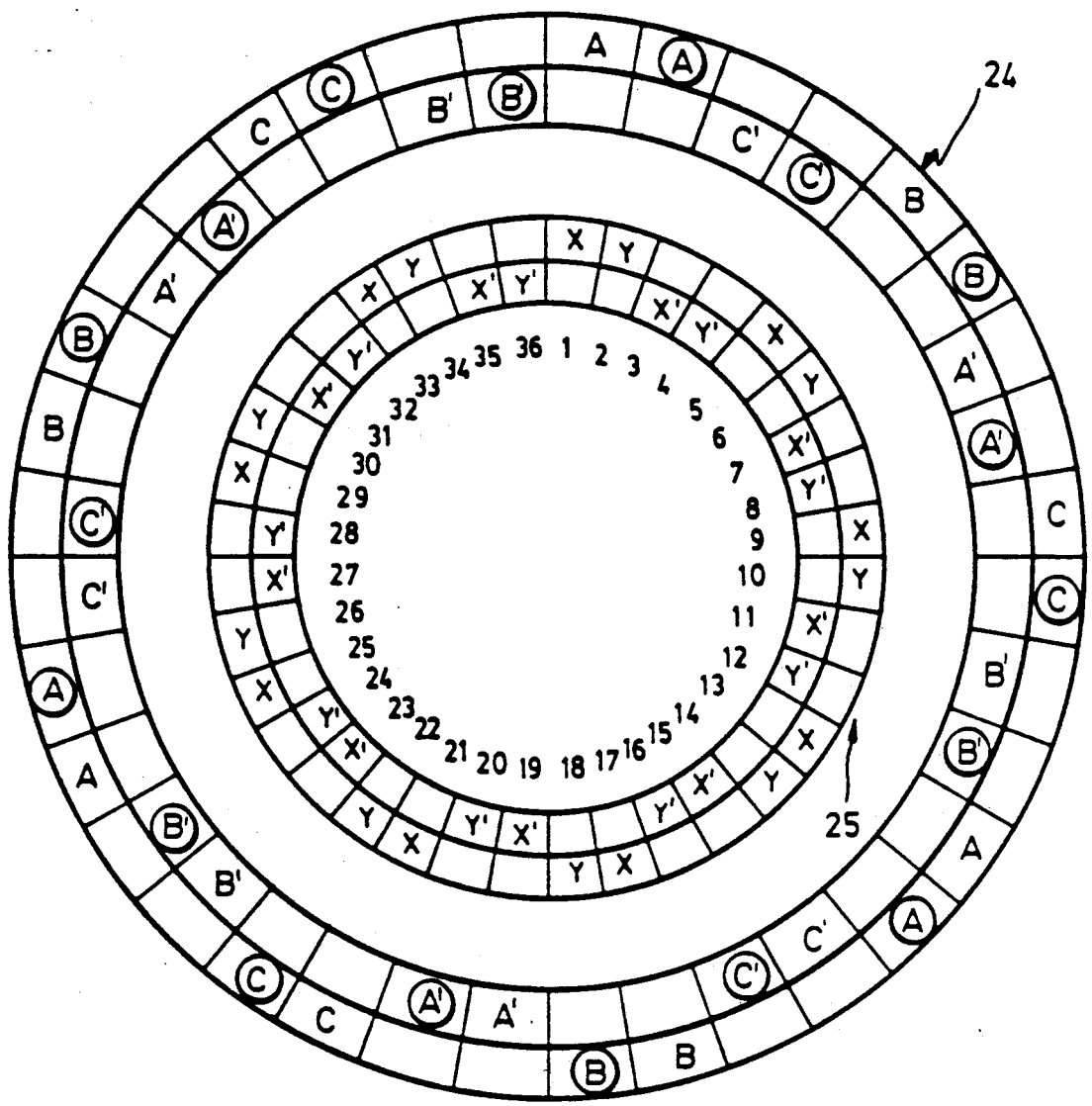
FIG. 17 schematically depicts the winding configuration for the armature of a machine to be excited through use of a multiphase inverter.

A fourth method of injection of third harmonic with a multiphase inverter. Referring now to FIG. 17, therein is schematically depicted a machine 74 having six fundamental poles in thirty-six slots. The windings of machine 74 are connected in two deltas 78, 80 displaced 30 electrical degrees from one another. Each delta 78, 80 is excited by a 3-phase fundamental frequency supply. Windings indicated by letters enclosed in circles in FIG. 17 represent windings of the second delta as opposed to windings represented by the unencircled letters. For example winding pair $A_1$–$A'_7$ is connected in delta 78, while winding $A_2$–$A'_8$ is connected in delta 80. Ring 75 depicts the distribution of the third harmonic phases in machine 74.

Figure 18:
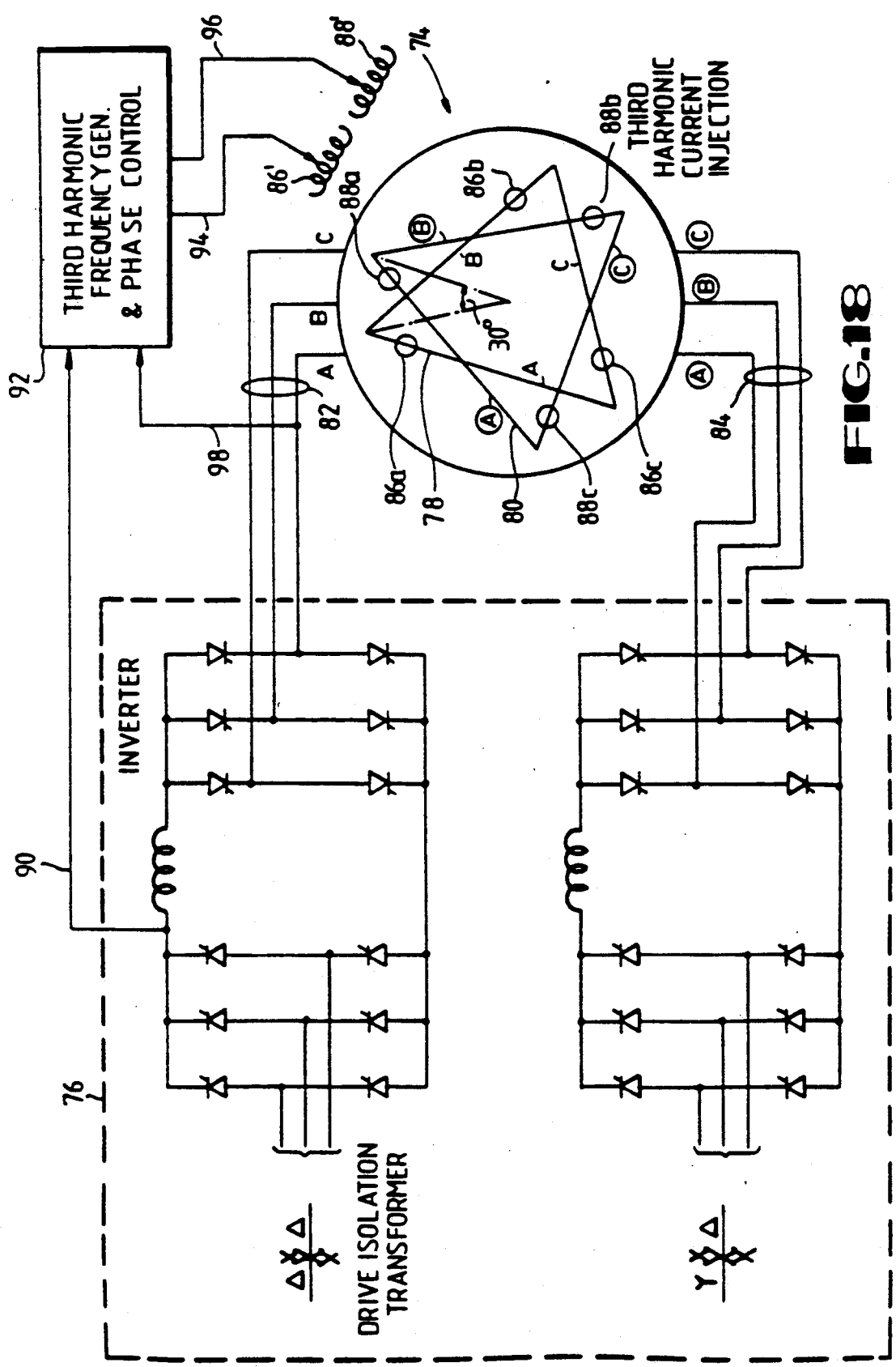
FIG. 18 schematically depicts the windings of the machine of FIG. 18.

FIG. 18 schematically depicts machine 74 and a multiphase inverter power supply 76 suitable for use therewith. In the method of this embodiment, neither the multiphase power transformers utilized with the apparatus of FIGS. 5 and 6, nor the volt-amp balancers of the various apparatus of FIGS. 7–16 are required. Multiphase inverter 76 provides two 3-phase fundamental frequencies 82, 84, where each is displaced 30~ from the other. The first fundamental frequency outputs 82 are coupled to first delta 78, while second fundamental frequency outputs 84 are coupled to second delta 80.

The third harmonic excitation is two phase. Each phase is injected into one of the fundamental delta windings 78, 80. Each leg of each delta, 78, 80, includes the secondary 86a, 86b, 86c; 88a, 88b, 88c, respectively, of a transformer having its primary coupled to a third harmonic frequency supply. Because this multiphase inverter method of the present invention is particularly suitable for use with adjustable frequency drives, it is advantageous to generate the third harmonic frequency directly in response to the fundamental frequency. This is accomplished through conventional means that are well known to those skilled in the art. For example, the rectified power 90 is applied to a third harmonic frequency generator 92 that outputs two phases 94, 96. Third harmonic frequency generator 92 is preferably responsive to one phase of a fundamental frequency output 98 to enable precise frequency and phase control of third harmonic frequency phases 94 and 96. Third harmonic frequency phases 94 and 96 coupled to primaries 86', 88' of transformer secondaries 86a, 86b, 86c; and 88a, 88b, 88c, respectively.

Each of the above-discussed methods and apparatus allows the optimizing of flux distribution in a polyphase AC machine, as well as the introduction of a third harmonic flux wave that interacts with an otherwise wasted naturally occurring third harmonic flux wave. As discussed in reference to FIGS. 1–3, the optimal phase relationship is selected between the harmonic excitation current and the fundamental excitation current to facilitate optimal distribution of the flux density and optional increases in the total flux per pole of the machine. As discussed in reference to FIGS. 19–23, the optimal phase relationship between the third harmonic flux wave generated by the third harmonic excitation and the waste flux wave produced by interaction between the fundamental flux wave and the rotor is determined by whether the machine is operating as a motor or as a generator.

Many modifications and variations may be made in the techniques and structures described and illustrated herein without departing from the spirit and the scope of the present invention. Accordingly, it is to be readily understood that the embodiments described and illustrated herein are illustrative only and are not to be considered as limitations for the present invention.

We claim:

1. A method of enhancing the torque in a synchronous machine having a stator and rotor, windings placed thereon, and an air gap formed therebetween, the method comprising the steps of:

generating a fundamental flux wave in the air gap of said machine by delivering a fundamental excitation signal to said stator winding;

generating an odd harmonic flux wave in said air gap of said machine by delivering an odd harmonic excitation signal to said stator winding, said odd harmonic flux wave rotating about said air gap in substantial unison with said fundamental flux wave;

generating rotor flux in the air gap of said machine by delivering an excitation signal to said rotor windings;

generating rotor space harmonics in said air gap of said machine by interaction between said fundamental flux wave and said rotor flux, said rotor space harmonics rotating in said air gap in substantial unison with said rotor and said odd harmonic flux wave; and controlling the phase angle of said odd harmonic flux wave relative to said rotor space harmonics.

2. A method, as set forth in claim 1, wherein the step of controlling the phase angle of said odd harmonic flux wave includes the step of controlling the phase angle between said odd harmonic flux wave and said rotor space harmonics so that said odd harmonic flux wave lags said rotor space harmonics.

3. A method, as set forth in claim 1, wherein the step of controlling the phase angle of said odd harmonic flux wave includes the step of controlling the phase angle between said odd harmonic flux wave and said rotor space harmonics so that said odd harmonic flux wave leads said rotor space harmonics.

4. A method, as set forth in claim 1, wherein the step of generating rotor space harmonics includes the step of controlling the magnitude and phase angle of the rotor space harmonics relative to the fundamental flux wave by altering the rotor so that the air-gap permeance of the rotor is altered.

5. A method of enhancing the torque in a synchronous machine having a stator and rotor, windings placed thereon, and an air gap formed therebetween, comprising the steps:

generating a fundamental flux wave rotating in the air gap of said machine at a first preselected speed by delivering a fundamental excitation signal to said stator winding generating an odd harmonic flux wave rotating in the air gap of said machine substantially at said first preselected speed by delivering an odd harmonic excitation signal to said stator winding;

generating rotor flux in the air gap of said machine by delivering an excitation signal to said rotor windings;

generating rotor space harmonics is said air gap of said machine by interaction between said fundamental flux wave and said rotor flux, said rotor space harmonics rotating in said air gap substantial at said first preselected speed with said rotor; and controlling the phase angle between said odd harmonic flux wave and said rotor space harmonics so that said odd harmonic flux wave lags said rotor space harmonics.

6. A method, as set forth in claim 5, wherein the step of generating rotor space harmonics includes the step of controlling the magnitude and phase angle of the rotor space harmonics relative to the fundamental flux wave by altering the rotor so that the air-gap permeance of the rotor is altered.

7. A method of enhancing the torque in a synchronous machine having a stator and rotor, windings placed thereon, and an air gap formed therebetween, comprising the steps:

generating a fundamental flux wave in the air gap of said machine by delivering a fundamental excitation signal to said stator winding generating an odd harmonic flux wave in said air gap of said machine by delivering an odd harmonic excitation signal to said stator winding, said odd harmonic flux wave rotating about said air gap in substantial synchronism with said fundamental flux wave;

generating rotor flux in the air gap of said machine by delivering an excitation signal to said rotor windings;

generating rotor space harmonics is said air gap of said machine by interaction between said fundamental flux wave and said rotor flux, said rotor space harmonics rotating in said air gap in substantial synchronism with said rotor and said odd harmonic flux wave; and controlling the phase angle between said odd harmonic flux wave and said rotor space harmonics so that said odd harmonic flux wave leads said rotor space harmonics.

8. A method, as set forth in claim 7, wherein the step of generating rotor space harmonics includes the step of controlling the magnitude and phase angle of the rotor space harmonics relative to the fundamental flux wave by altering the rotor so that the air-gap permeance of the rotor is altered.

9. An apparatus for enhancing the torque in a synchronous machine having a rotor and a stator, and an air gap formed therebetween, comprising:

a stator winding;

means for delivering a fundamental excitation signal to said stator winding so that a fundamental flux wave is generated in the air gap of said machine;

means for delivering an odd harmonic excitation signal to said stator winding so that an odd harmonic flux wave is generated in said air gap of said machine, rotating about said air gap in substantial unison with said fundamental flux wave;

a rotor winding;

means for controllably generating rotor flux in the air gap of said machine be delivering an excitation signal to said rotor winding, said fundamental flux wave interacting with said rotor flux to produce rotor flux harmonics in the air gap of said machine, rotating in substantial unison with said rotor; and means for controlling the phase angle of said odd harmonic flux wave relative to said rotor space harmonics.

10. An apparatus, as set forth in claim 9, wherein the means for controlling the phase angle of said odd harmonic flux wave includes means for controlling the phase angle between said odd harmonic flux wave and said rotor space harmonics so that said odd harmonic flux wave lags said rotor space harmonics.

11. An apparatus, as set forth in claim 9, wherein the means for controlling the phase angle of said odd harmonic flux wave includes means for controlling the phase angle between said odd harmonic flux wave and said rotor space harmonics so that said odd harmonic flux wave leads said rotor space harmonics.

12. An apparatus, as set forth in claim 9, wherein the means for generating rotor space harmonics includes the means for controlling the magnitude and phase angle of the rotor space harmonics relative to the fundamental flux wave by altering the shape of the rotor so that the air-gap permeance of the rotor is altered.

13. An apparatus, as set forth in claim 9, wherein the means for generating rotor space harmonics includes the means for controlling the magnitude and phase angle of the rotor space harmonics relative to the fundamental flux wave by altering the rotor winding so that the air-gap permeance of the rotor is altered.

14. An apparatus, as set forth in claim 9, wherein said stator winding includes first and second separate windings for respectively receiving the fundamental and odd harmonic excitation signals.

15. An apparatus, as set forth in claim 14, wherein said second stator winding has a number of poles corresponding to the number of poles of the first winding times the odd harmonic excitation applied to the second stator winding whereby the fundamental and odd harmonic flux waves travel in synchronous relation to one another.

16. An apparatus, as set forth in claim 9, wherein said stator winding includes a single set of windings that are adapted for receiving both the fundamental and odd harmonic excitation signals.

17. An apparatus, as set forth in claim 16, wherein said single set of windings are connected in a plurality of deltas.

18. An apparatus, as set forth in claim 17, wherein said deltas are current balanced relative to one another.

19. An apparatus, as set forth in claim 18, wherein said deltas are coupled to one another through transformers.

20. An apparatus, as set forth in claim 19, wherein each of said deltas has a plurality of legs and said odd harmonic excitation has a plurality of phases where one phase of said odd harmonic excitation is delivered to each leg of one of said deltas.

* * * * *

UNITED STATES PATENT AND TRADEMARK OFFICE
CERTIFICATE OF CORRECTION

PATENT NO. : 5,053,689
DATED : October 1, 1991
INVENTOR(S) : HERBERT S. WOODSON AND JOHN S. HSU It is certified that error appears in the above-indentified patent and that said Letters Patent is hereby corrected as shown below:

Column 2, line 45, delete "he" and substitute --of the--.

Column 3, line 10, delete "depict" and substitute --depicts--.

Column 13, line 54, delete "$[n_3/(3xP_1)]$" and substitute --$[n_s/(3xP_f)]$--.

Column 14, line 17, after "2:1" insert --relative to tap 54a, the line current of phase A conveys--.

Column 14, line 34, delete "top" and substitute --tap--.

Column 14, line 34, delete "and" and substitute --are--.

Column 15, line 6, after "reversed" insert --relative to the polarity of third harmonic transformers--.

Column 15, line 57, after "harmonic" insert --frequencies utilizes a single stator winding in conjunction--.

Column 15, line 67, delete ";".

UNITED STATES PATENT AND TRADEMARK OFFICE
CERTIFICATE OF CORRECTION

PATENT NO. : 5,053,689
DATED : October 1, 1991
INVENTOR(S) : HERBERT S. WOODSON AND JOHN S. HSU It is certified that error appears in the above-indentified patent and that said Letters Patent is hereby corrected as shown below:

```
Column 18, line 43, delete "be" and substitute --by--.
```

Signed and Sealed this

Twenty-third Day of August, 1994

Attest:

BRUCE LEHMAN

*Attesting Officer*  *Commissioner of Patents and Trademarks*